United States Patent [19]
Sheehan

[11] Patent Number: 6,144,838
[45] Date of Patent: Nov. 7, 2000

[54] TREE-BASED APPROACH TO PROFICIENCY SCALING AND DIAGNOSTIC ASSESSMENT

[75] Inventor: Kathleen M. Sheehan, Skillman, N.J.

[73] Assignee: Educational Testing Services, Princeton, N.J.

[21] Appl. No.: 09/215,685

[22] Filed: Dec. 18, 1998

Related U.S. Application Data

[60] Provisional application No. 60/068,313, Dec. 19, 1997.

[51] Int. Cl.⁷ ...................................................... G09B 7/00
[52] U.S. Cl. .......................... 434/362; 434/118; 434/322; 434/350
[58] Field of Search .................................... 454/118, 169, 454/322, 323, 327, 335, 353, 362, 350; 706/45, 927; 702/108, 181; 707/100, 104, 500

[56] References Cited

U.S. PATENT DOCUMENTS

| | | | |
|---|---|---|---|
| 4,012,848 | 3/1977 | Diament et al. | 434/307 R |
| 4,247,895 | 1/1981 | Weber | 434/327 |
| 4,820,165 | 4/1989 | Kanapa | 434/276 |
| 5,059,127 | 10/1991 | Lewis et al. | |
| 5,117,353 | 5/1992 | Stipanovich et al. | 705/11 |
| 5,763,217 | 6/1998 | Cynader et al. | 435/69.1 |
| 5,797,130 | 8/1998 | Nelson et al. | 705/11 |
| 5,987,302 | 11/1999 | Driscoll et al. | 434/353 |
| 5,991,595 | 11/1999 | Romano et al. | 434/353 |
| 6,029,195 | 2/2000 | Herz | 709/219 |

OTHER PUBLICATIONS

Beaton, et al., "Interpreting scales through scale anchoring," *Journal of Educational Statistics*, vol. 17, pp. 191–204, 1992.

Beller, "Tree versus geometric representation of tests and items," *Applied Psychological Measurement*, vol. 14(1), pp. 13–28, 1990.

Breland, et al., "English Word Frequency Statistics: Analysis of a Selected Corpus of 14 Million Tokens," College Entrance Examination Board, New York, NY, pp. 1–6, 1997.

Brieman, et al., "Classification and Regression Trees," Wadsworth & Brooks/Cole, pp. 216–264, 1984.

Clark, et al., "Tree–Based Models," in Chambers, J.M. and T.J. Hastie, Eds., *Statistical Models in S*, Wadsworth and Brooks/Cole, pp. 377–378, 1992.

Cleveland, et al., "Local Regression Models," in J.M. Chambers & T.J. Hastie, Eds., *Statiscial Models in S*, Wadsworth & Brooks/Cole, pp. 312–314, 1992.

James E. Corter, "Using Clustering Methods to Explore the Structure of Diagnostic Tests," in *Cognitively Diagnostic Assessment*, P. Nichols, S. Chapman & R. Brennan, Eds., Lawrence Erlbaum Associates, pp. 305–326, 1995.

(List continued on next page.)

*Primary Examiner*—Joe H. Cheng
*Attorney, Agent, or Firm*—Woodcock Washburn Kurtz Mackiewicz & Norris LLP

[57] ABSTRACT

A method for diagnostic assessment and proficiency scaling of test results is provided. The method uses as input a vector of item difficulty estimates for each of n items and a matrix of hypothesized skill classifications for each of said n items on each of k skills. The method includes using a tree-based regression analysis based on the vector and matrix to model ways in which required skills interact with different item features to produce differences in item difficulty. This analysis identifies combinations of skills required to solve each item, and forms a plurality of clusters by grouping the items according to a predefined prediction rule based on skill classifications. A nonparametric smoothing technique is used to summarize student performance on the combinations of skills identified in the tree-based analysis. The smoothing technique results in cluster characteristic curves that provide a probability of responding correctly to items with specified skill requirements. The probability is expressed as a function of underlying test score.

12 Claims, 20 Drawing Sheets

OTHER PUBLICATIONS

Susan E. Embretson, "A Measurement Model for Linking Individual Learning to Processes and Knowledge: Application to Mathematical Reasoning," *Journal of Educational Measurement*, vol. 32, pp. 277–294, 1995.

Enright, et al., "Items by Design: The Impact of Systematic Feature Variation on Item Statistical Charactersticis," Draft ETS Report GRE No. 95–15, Princeton, NJ; Educational Testing Service, 1998.

Gitomer, et al., "Performance Modeling That Integrates Latent Trait and Latent Class Theory," *Journal of Educational Measurement*, vol. 28, pp. 173–189, 1991.

Gitomer, et al., "Diagnostic Assessment of Troubleshooting Skill in an Intelligent Tutoring System," in *Cognitively Diagnostic Assessment*, P. Nicols, S. Chapman & R. Brennan, Eds., Lawrence Erlbaum Associates, pp. 73–101, 1995.

Hambleton, et al., "Item Response Theory, Principles and Applications," Kluwer–Nijhoff Publishing, pp. 147–149, 1985.

Kirsch, et al., "Exploring document literacy: Variables underlying the performance of young adults," *Reading Research Quarterly*, vol 25, pp. 5–30, 1990.

Lewis, et al., "Using Bayesian Decision Theory to Design a Computerized Mastery Test," *Applied Psychological Measurement*, vol. 14, pp. 367–386, 1990.

Robert J. Mislevy, "Probability–Based Interfence in Cognitive Diagnosis," in *Cognitively Diagnostic Assessment*, P. Nichols, S. Chapman & R. Brennan, Eds., Lawrence Erlbaum Associates, pp. 43–71, 1995.

Kathleen M. Sheehan, "A Tree–Based Approach to Proficiency Scaling and Diagnostic Assessment," *Journal of Educational Measurements*, vol. 34, pp. 333–352, 1997.

Sheehan, et al., "A Tree–Based Analysis of Items from an Assessment of Basic Mathematics Skills," ETS Research Report No. RR–94–14, Eucational Testing Service, 1994, p. 1–28.

Sheehan, et al., "Computerized Mastery Testing with Nonequivalent Testlets," *Applied Psychological Measurement*, vol. 16, No. 1, pp. 65–76, 1992.

Kikumi K. Tatsuoka, "Architecture of Knowledge Structures and Cognitive Diagnosis," in *Cognitively Diagnostic Assessment*, P. Nichols, S. Chapman & R., Brennan, Eds., Lawrence Erlbaum Associates, pp. 327–359, 1995.

Tatsuoka, et al. "Proficiency Scaling Based on Conditional Probability Functions for Attributes," ETS Research Report No. RR–93–50–ONR, Educational Testing Service, 1993, p. 1–70.

Wainer, et al., "Some Paths Toward Making Praxis Scores More Useful" ETS Research Report RR–98–44, Educational Testing Service, 1998, p. 1–30.

Benjamin D. Wright, "Solving Measurement Problems with the Rasch Model," *Journal of Educational Measurement*, vol. 14, No. 2, pp. 97–116, 1977.

Preliminary Skill Descriptions and Sample Items

| |
|---|
| Skill A: Analyze surrounding text to determine the precise meaning intended by an author for a word which could have different meanings when used in different contexts. (Standard Word Usage)<br>S: In line 43, "mere" most nearly means _____.<br>K: simple |
| Skill: B: Infer an author's reasons for including a specific example quote in a reading passage when that passage has been classified as having a simple idea structure. [Specific Purpose]<br>S: The author refers to the life of Mai Mai Sze (lines 11–14) chiefly to _____.<br>K: illustrate the difficulty of determining one's identity after many relocations |
| Skill C: Demonstrate specific or global understanding of a concept or idea which was specifically discussed in a reading passage, when passage has been classified as having a simple idea structure. [Specific Purpose]<br>S: The passage serves primarily to _____.<br>K: inform the reader of the conflicting senses of identity experienced by Chinese American and other multicultural writers |
| Skill D: Demonstrate specific or global understanding of a concept or idea which was specifically discussed in a reading passage, when that passage has been classified as having a complex idea structure and the correct option contains features which correspond literally of synonymously with words or phrases appearing in the referenced passage. [Level 1 CorrKey]<br>S: Murger's Bohemians would differ most from the bourgeois in that Bohemians _____.<br>K: are motivated by strong artistic impulses |
| Skill E: Determine which of several alternative methods for re-expressing a particular sentence most accurately preserves the author's original meaning, when the sentence involves poetic or unusual word usage.<br>[Poetic Unusual/ Word Usage]<br>S: In line 26, "abandon myself" most nearly means _____.<br>K: become absorbed in |

FIG. 2A

Skill F: Demonstrate specific or global understanding of a concept or idea which was specifically discussed in a reading passage, when that passage has been classified as having a complex idea structure and the correct option as well as one of the distractors, contains features which coorespond literally of synonymously with words or phrases appearing in the referenced passage. [Level 2 Key&Dist]

Skill G: Determine an author's attitude towards the material being presented OR understand the specific techniques used by an author to accomplish some rhetorical objective. [Attitude Technique]
S: The statement in lines 92-93 is best interpreted as conveying ___
K: skepticism Skill H: Determine which of several alternative "what if" or "application" type statements is most consistent with a specific topic treated in a reading passage. [Apply Extrap.]
S: If the author had wished to explain why "most" people feel the way they do, the explanation would have probably focused on _____.
K: the lack of objectivity in the classification of Homo Sapiens Skill I: Determine which of several alternative abstract representations most accurately reflects an author's main or supporting idea, when the reference reading passage has been classified as having a complex idea structure.
[Level 3 Abs. Gen.]
S: The passage is best described as _____.
K: a definition of a concept

FIG. 2B

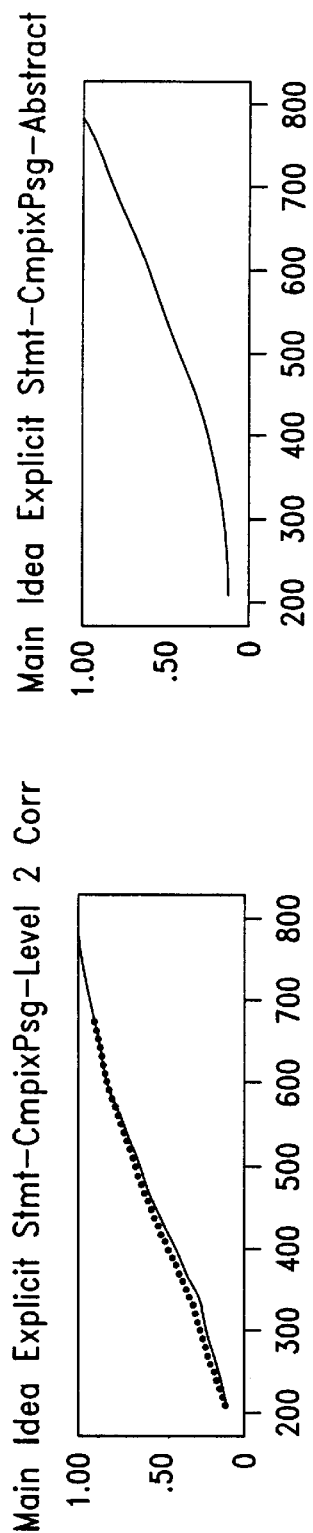
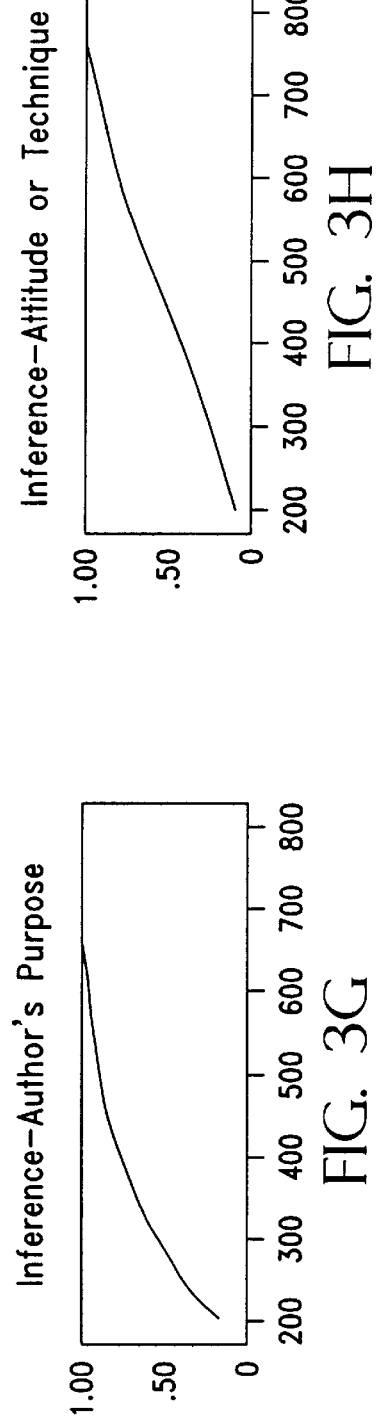
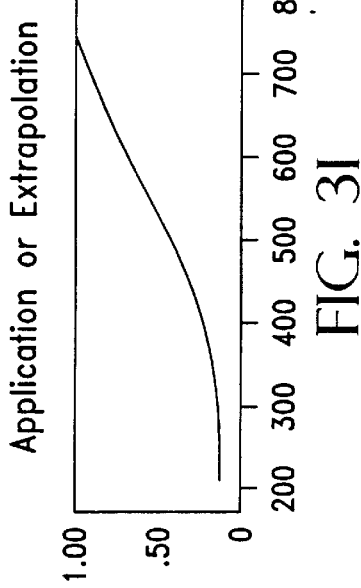

Expected Skill Mastery Probabilities
For Examinees Selected Score Levels

|  | 400 | 450 | 500 |
|---|---|---|---|
| Skill A: Analyze surrounding text to determine the precise meaning intended by an author for a word which could have different meanings when used in different contexts. | .83 | .89 | .92 |
| Skill B: Infer an author's reasons for including a specific example or quote in a reading passage when that passage has been classified as having a simple idea structure. | .83 | .90 | .94 |
| Skill C: Demonstrate specific or global understanding of a concept or idea which was specifically disscused in a reading passage, when that passage has been classified as having a simple idea structure. | .79 | .86 | .89 |
| Skill D: Demonstrate specific or global understanding of a concept or idea which was specifically discussed in a reading passage, when that passage has been classified as having a complex idea structure and the correct option contains features which coorespond literally of synonymously with words or phrases appearing in the referenced passage. | .79 | .86 | .89 |
| Skill E: Determine which of several alternative methods for reexpressing a particular sentence most accurately preserves the author's original meaning, when the sentence involves poetic or unusual word usage. | .59 | .68 | .76 |

FIG. 4A

Expected Skill Mastery Probabilities
For Examinees Selected Score Levels

|  | 400 | 450 | 500 |
|---|---|---|---|
| Skill F: Demonstrate specific or global understanding of a concept or idea which was specifically discussed in a reading passage, when that passage has been classified as having a complex idea structure and the correct option as well as one of the distractors, contains features which coorespond literally of synonymously with words or phrases appearing in the reference passage. | .46 | .57 | .67 |
| Skill G: Determine an author's attitude towards the material being presented OR understand the specific techniques used by an author to accomplish some rhetorical objective. | .41 | .51 | .62 |
| Skill H: Determine which of several alternative "what if " or "application" type statements is most consistent with a specific topic treated in a reading passage. | .23 | .32 | .43 |
| Skill I: Determine which of several alternative abstract representations most accurately reflects an author's main or supporting idea, when the referenced reading passage has been classified as having a complex idea structure. | .27 | .34 | .43 |

FIG. 4B

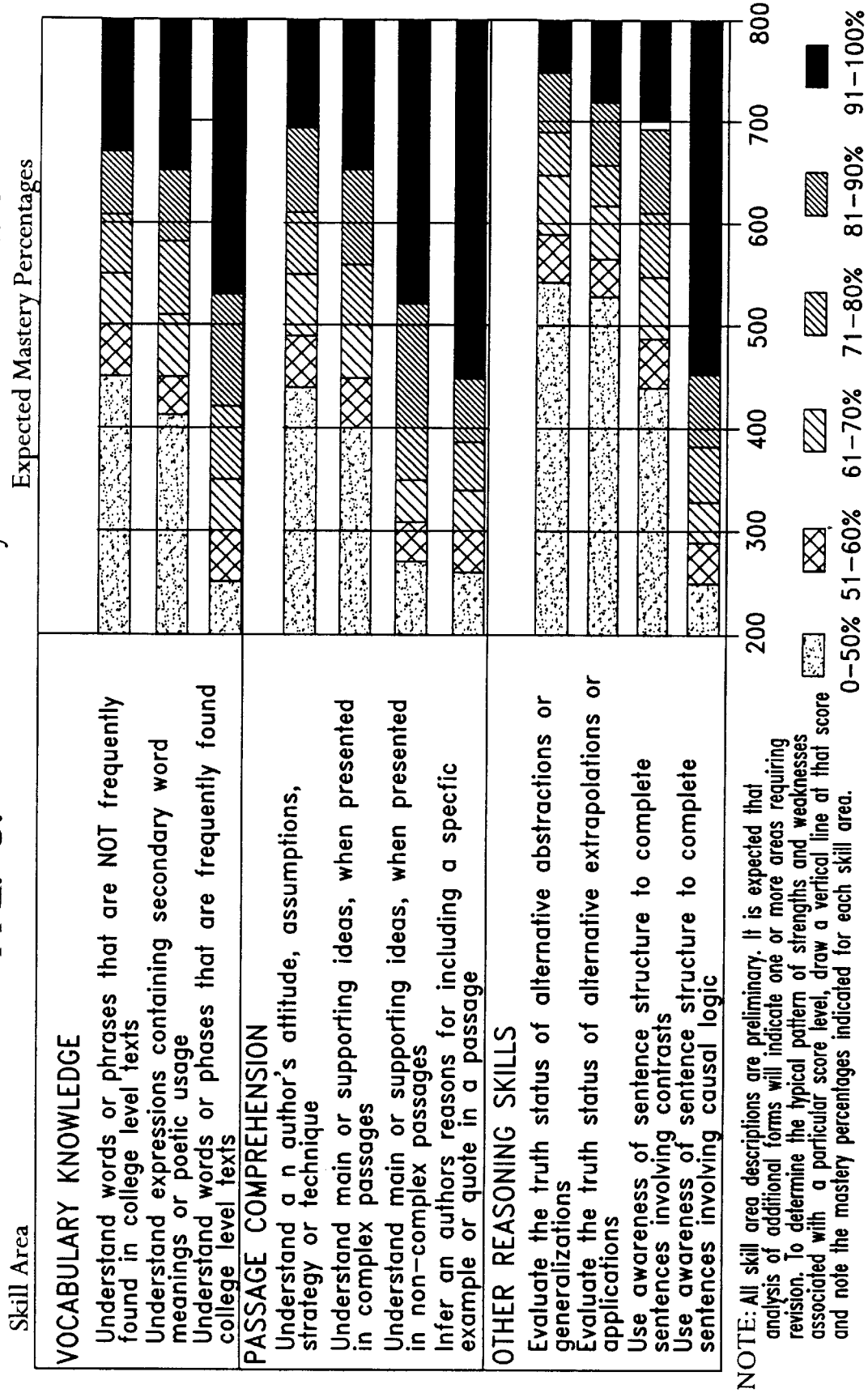
FIG. 5. Skill Areas Tested by the SAT I Verbal Measure

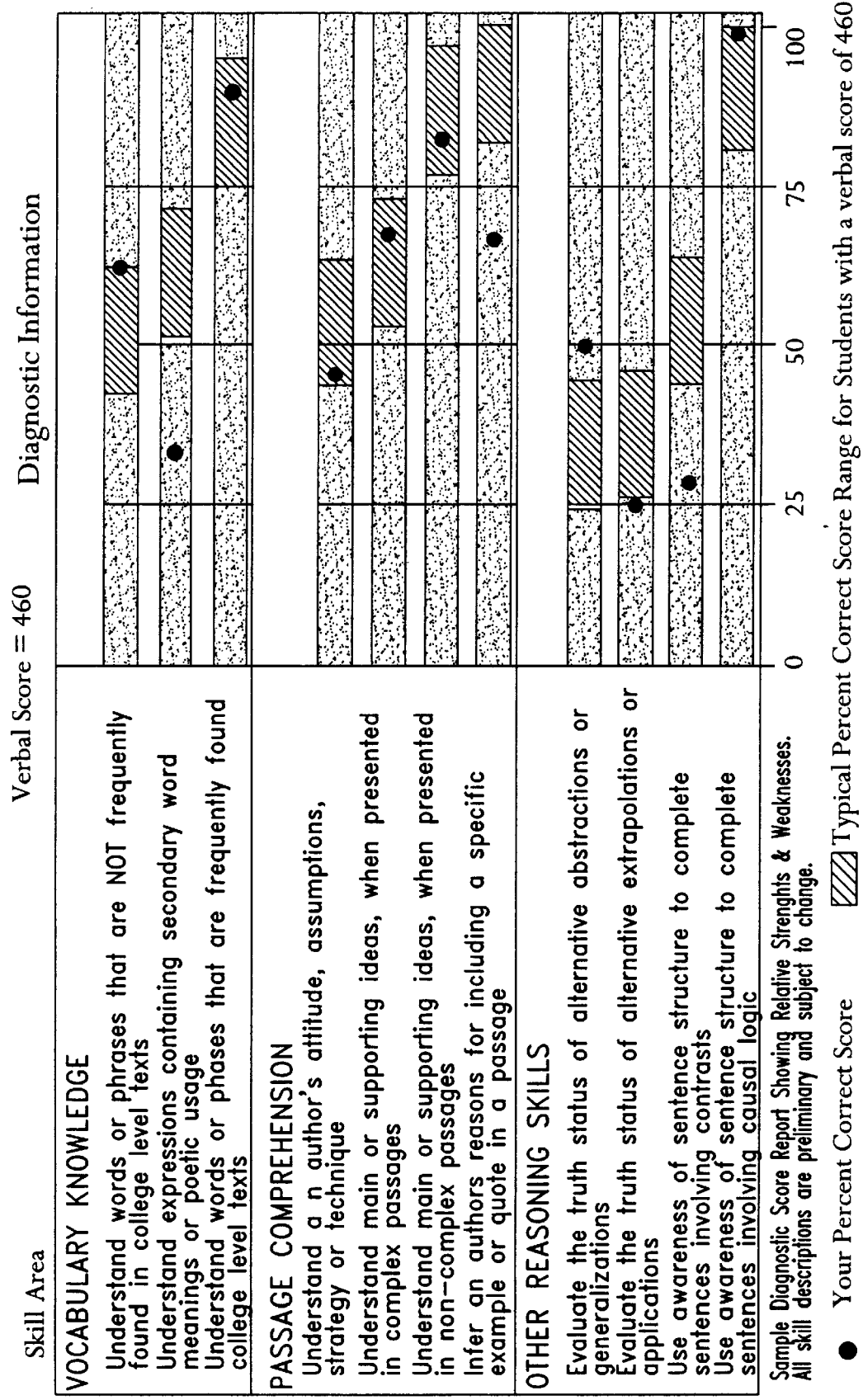
FIG. 6. Diagnostic Score Report for student #29

A Comparison of Model Fit Under Different Clustering Solutions

| Clustering Solution | $\Sigma\Sigma (x_{ij} - m_{ij})^2$ | $P_c$ |
|---|---|---|
| 1 TCC | 98,060.95 | 63 |
| 8 CCCs | 85,570.73 | 90 |
| 9 CCCs | 85,416.40 | 91 |
| 40 ICCs | 81,178.75 | 100 |

FIG. 7

Design Matrix for 48 GRE Rate Problems

| Effect | Coefficient | t statistic | Significance Probability |
|---|---|---|---|
| Intercept | -2.5964 | -13.7366 | 0.0000 |
| Manipulate=Variable | 2.3597 | 12.4843 | 0.0000 |
| Schema = DRT | 1.1193 | 5.9217 | 0.0000 |
| Constraints = 4 | 1.0919 | 5.7769 | 0.0000 |

FIG. 10

| State | Mastery Status on Attribute A1 through A6 | Theta | Zeta |
|---|---|---|---|
| 1. Can solve Cost problems involving manipulations with numbers and no more than three constraints. | 101010 | -3.18 | -1.72 |
| 2. Can solve Cost problems involving manipulations with numbers and three or four. constraints. | 101011 | -2.03 | -2.83 |
| 3. Can solve both Cost and DRT problems involving manipulations with numbers and three or four. constraints. | 101111 | -0.39 | -2.59 |

FIG. 11

| Effect | Coefficient | t statistic | Significance Probability |
|---|---|---|---|
| Intercept | −3.0128 | −18.8541 | 0.0000 |
| Manipulate = Variable | 3.1925 | 15.7946 | 0.0000 |
| Manip. Numbers & DRT | 1.9521 | 9.6578 | 0.0000 |
| Manip. Variables & DRT | 0.2865 | 1.4174 | 0.1636 |
| Constraints = 4 | 1.0919 | 7.6398 | 0.0000 |

FIG. 13

|  | | Obs. Response | |
|---|---|---|---|
| | | 1 | 0 |
| Ideal | 1 | a | b |
| Response | 0 | c | d |

FIG. 15

| State | Mastery Status Attributes A1 thru A6 | Theta | Zeta |
|---|---|---|---|
| [State 1: NC3] Can solve Cost problems involving manipulations with numbers and no more than three constraints. | 101010 | −3.18 | −1.72 |
| [State 2: NC4] Can solve Cost problems involving manipulations with numbers and and three or four constraints. | 101011 | −2.03 | −2.83 |
| [State 3: ND3] Can solve Cost problems involving manipulations with numbers three or four contstraints and can solve DRT problems involving manipulations with numbers and at most three constraints. | Cannot Be Specified | −1.06 | −3.52 |
| [State 4: ND4] Can solve Cost problems involving manipulations with numbers and three or four constraints and can solve DRT problems involving manipulations with numbers and three or four constraints. | 101111 | −0.39 | −2.59 |
| [State 5: V3] Can solve all problems involving manipulations with numbers and can solve problems involving manipulations with variables if they have no more than three constraints. | Cannot Be Specified | 0.88 | −2.52 |
| [State 6: V4] Can solve all problems requiring manipulations with numbers and can solve all problems requiring manipulations with variables. | 111111 | 3.00 | 1.01 |

FIG. 14

TREE-BASED APPROACH TO PROFICIENCY SCALING AND DIAGNOSTIC ASSESSMENT

CROSS-REFERENCE TO RELATED APPLICATIONS

This application claims priority from U.S. Provisional Application Serial No. 60/068,313, filed Dec. 19, 1997, the contents of which are hereby incorporated by reference.

FIELD OF THE INVENTION

The present invention relates to standardized test evaluation. More particularly, the present invention relates to a tree-based approach to proficiency scaling and diagnostic assessment of standardized test results.

BACKGROUND OF THE INVENTION

The traditional outcome of an educational test is a set of test scores reflecting the numbers of correct and incorrect responses provided by each student. While such scores may provide reliable and stable information about students' standing relative to a group, they fall short of indicating the specific patterns of skill mastery underlying students' observed item responses. Such additional information may help students and teachers better understand the meaning of test scores and the kinds of learning which might help to improve those scores.

Procedures for translating observed test results into instructionally-relevant Statements about students' underlying patterns of skill mastery may be designed to provide student-level diagnostic information or group-level diagnostic information. Student-level diagnoses characterize the individual strengths and weaknesses of individual students. Group-level diagnoses characterize the strengths and weaknesses expected for students scoring at specified points on a test's reported score scale. A collection of group-level diagnoses designed to span a test's reported score range is termed a proficiency scale.

Both group- and student-level diagnoses can provide useful feedback. The detailed information available from a student-level diagnosis can help human or computerized tutors design highly individualized instructional intervention. The cross-sectional view provided by a set of group-level diagnoses can be used to: (a) demonstrate that the skills tapped by a particular measurement instrument are in fact those deemed important to measure, and (b) suggest likely areas of improvement for individual students. Both types of diagnoses can also be used to inform course placement decisions.

Procedures for generating group-level and/or student-level diagnoses have been proposed by a number of researchers. Beaton and Allen proposed a procedure called Scale Anchoring which involved (a) identifying subsets of test items which provided superior discrimination at successive points on a test's reported score scale; and (b) asking subject-area experts to review the items and provide detailed descriptions of the specific cognitive skills that groups of students at or close to the selected score points would be expected to have mastered. (Beaton, A. E. & N. L. Allen, Interpreting scales through scale anchoring, Journal of Educational Statistics, vol. 17, pp. 191–204, 1992.) This procedure provides a small number of group-level diagnoses, but no student-level diagnoses. The estimated group-level diagnoses are specified in terms of the combinations of skills needed to solve items located at increasingly higher levels on a test's reported score scale.

Tatsuoka, Birenbaum, Lewis, and Sheehan outlined an approach which provides both student- and group-level diagnoses. (Tatsuoka, K.K., Architecture of knowledge structures and cognitive diagnosis, P. Nichols, S. Chipman & R. Brennan, Eds., Cognitively diagnostic assessment. Hillsdale, N.J.: Lawrence Erlbaum Associates, 1995. Tatsuoka, K., M. Birenbaum, C. Lewis, & K. Sheehan, Proficiency scaling based on conditional probability functions for attributes, ETS Research Report No. RR-93-50 -ONR, Princeton, N.J.: Educational Testing Service, 1993.) Student-level diagnoses are generated by first hypothesizing a large number of latent skill mastery states and then using a Mahalanobis distance test (i.e. the Rule Space procedure) to classify as many examinees as possible into one or another of the hypothesized states. The classified examinees' hypothesized skill mastery patterns (i.e. master/ nonmaster status on each of k skills) are then summarized to provide group-level descriptions of the skill mastery status expected for students scoring at successive points on a test's reported score scale. For example, in an analysis of 180 mathematics items selected from the Scholastic Assessment Test (SAT 1), 94% of 6,000 examinees were classified into one of 2,850 hypothesized skill mastery states (Tatsuoka, 1995, pg 348).

Gitomer and Yamamoto generate student-level diagnoses using the Hybrid Model. (Gitomer, D. H. & K. Yamamoto, Performance modeling that integrates latent trait and latent class theory, Journal of Educational Measurement, vol. 28, pp. 173–189, 1991.) In this approach, likelihood-based inference techniques are used to classify as many examinees as possible into a small number of hypothesized skill mastery states. For example, in an analysis of 288 logic gate items, 30% of 255 examinees were classified into one of five hypothesized skill mastery states (Gitomer & Yamamoto at 183). For each of the remaining examinees, Gitomer et al. provided an Item Response Theory (IRT) ability estimate which indicated standing relative to other examinees but provided no additional information about skill mastery.

Mislevy, Gitomer, and Steinberg generate student-level diagnoses using a Bayesian inference network. (Mislevy, R. J., Probability-based inference in cognitive diagnosis, P. Nichols, S. Chipman, & R. Brennan, Eds., Cognitively diagnostic assessment, Hillsdale, N.J.: Lawrence Erlbaum Associates, 1995. Gitomer, D. H., L. S. Steinberg, & R. J. Mislevy, Diagnostic assessment of troubleshooting skill in an intelligent tutoring system, P. Nichols, S. Chipman, & R. Brennan, Eds., Cognitively diagnostic assessment, Hillsdale, N.J.: Lawrence Erlbaum Associates, 1995.) This approach differs from the approaches described previously in two important respects: (1) students' observed item responses are modeled conditional on a multivariate vector of latent student-level proficiencies, and (2) multiple sources of information are considered when diagnosing mastery status on each of the hypothesized proficiencies. For example, in an analysis of fifteen fraction subtraction problems, nine student-level variables were hypothesized and information about individual skill mastery probabilities was derived from two sources: population-level skill mastery base rates and examinees' observed item response vectors (Mislevy, 1995).

In each of the diagnostic approaches described above, it is assumed that the test under consideration is a broad-based proficiency test such as those that are typically used in educational settings. Lewis and Sheehan consider the problem of generating student-level diagnoses when the item response data is collected via a mastery test, that is, a test designed to provide accurate measurement at a single underlying proficiency level, such as a pass/fail point. (Lewis, C. & K. M. Sheehan, Using Bayesian decision theory to design a computerized mastery test, Applied Psychological Measurement, vol. 14, pp. 367–386, 1990. Sheehan, K. M. & C. Lewis, Computerized mastery testing with nonequivalent testlets, Applied Psychological Measurement, vol. 16, pp. 65–76, 1992.) In this approach, decisions regarding the mastery status of individual students are obtained by first specifying a loss function and then using Bayesian decision theory to define a decision rule that minimizes posterior expected loss.

The prior art methods are known to be computationally intensive and not to consider any observed data. Moreover, these approaches are form dependent. That is, the set of knowledge states obtained excludes all states that might have been observed with a different form, but could not have been observed with the current form. Finally, the prior art methods cannot capture states involving significant interaction effects if those effects are not specified in advance.

Thus there is a need in the art for a less computationally intensive method designed to search for, and incorporate, all significant skill-mastery patterns that can be determined from the available item difficulty data. There is a further need in the art for a form independent approach that provides all of the knowledge states which could have been observed, given the collection of forms considered in the analysis. There is a further need in the art for an approach that automatically incorporates all identified interaction states so that the success of the procedure is not critically dependent on detailed prior knowledge of the precise nature of the true underlying proficiency model.

SUMMARY OF THE INVENTION

The present invention fulfills these needs by providing methods for diagnostic assessment and proficiency scaling of test results for a plurality of tests, each test having at least one item and each item having at least one feature. The method of the invention uses as input a vector of item difficulty estimates for each of n items and a matrix of hypothesized skill classifications for each of the n items on each of k skills. A tree-based regression analysis based on the input vector and matrix is used to model ways in which required skills interact with different item features to produce differences in item difficulty. The tree-based analysis identifies combinations of skills required to solve each item.

A plurality of clusters is formed by grouping the items according to a predefined prediction rule based on skill classifications. Preferably, the plurality of clusters is formed by successively splitting the items, based on the identified skill classifications, into increasingly homogeneous subsets called nodes. For example, the clusters can be formed by selecting a locally optimal sequence of splits using a recursive partitioning algorithm to evaluate all possible splits of all possible skill classification variables at each stage of the analysis. In a preferred embodiment, a user can define the first split in the recursive analysis.

Ultimately, a plurality of terminal nodes is formed by grouping the items to minimize deviance among items within each terminal node and maximize deviance among items from different terminal nodes. At this point, a mean value of item difficulty can be determined for a given terminal node based on the items forming that node. The value of item difficulty is then predicted, for each item in the given terminal node, to be the corresponding mean value of item difficulty.

A nonparametric smoothing technique is used to summarize student performance on the combinations of skills identified in the tree-based analysis. The smoothing technique results in cluster characteristic curves that provide a probability of responding correctly to items with specified skill requirements. This probability is expressed as a function of underlying test score.

Group-level proficiency profiles are determined from the cluster characteristic curves for groups of examinees at selected underlying test scores. Student-level diagnoses are determined by deriving an expected cluster score from each cluster characteristic curve and comparing a cluster score for each examinee to the expected cluster score.

In another preferred embodiment of a method according to the present invention, a vector of item difficulty estimates for each of n items is defined, along with a matrix of hypothesized skill classifications for each of the n items on each of k hypothesized skills. A tree-based regression technique is used to determine, based on the vector and matrix, the combinations of cognitive skills underlying performance at increasingly advanced levels on the test's underlying proficiency scale using. Preferably, the combinations are determined by forming a plurality of terminal nodes by grouping the items to minimize deviance among items within each terminal node and maximize deviance among items from different terminal nodes. The combinations are validated using a classical least squares regression analysis. The set of all possible subsets of combinations of cognitive skills that could have been mastered by an individual examinee is generated and the k hypothesize skills are redefined to form a set of k' redefined skills such that each of the k' redefined skills represents one of the terminal nodes.

BRIEF DESCRIPTION OF THE DRAWINGS

The present invention will be better understood, and its numerous objects and advantages will become apparent by reference to the following detailed description of the invention when taken in conjunction with the following drawings, in which:

FIGS. 2A and 2B show a table of preliminary skill descriptions and sample items;

FIGS. 3A–3I show cluster characterization curves estimated for SAT reading comprehension data;

FIGS. 4A and 4B show a table of expected skill mastery probabilities for examinees at selected score levels;

FIG. 5 shows a bar chart of group-level proficiency profiles determined from cluster characteristic curves for skill areas tested by the SAT I Verbal measure;

FIG. 6 shows a diagnostic score report for a selected student;

FIG. 7 shows a comparison of model fit under four different clustering solutions;

FIG. 10 shows initial least squares regression results for the GRE problem variant data;

FIG. 11 shows three of 64 knowledge states generated with a Boolean procedure;

FIG. 13 shows a revised linear regression model for the GRE problem variant data;

FIG. 14 shows six high frequency knowledge states as determined from the tree-based analysis the results of which are shown in FIG. 12;

FIG. 15 shows a table of an examinee's observed response data;

DETAILED DESCRIPTION OF THE PREFERRED EMBODIMENTS

Figure 1:
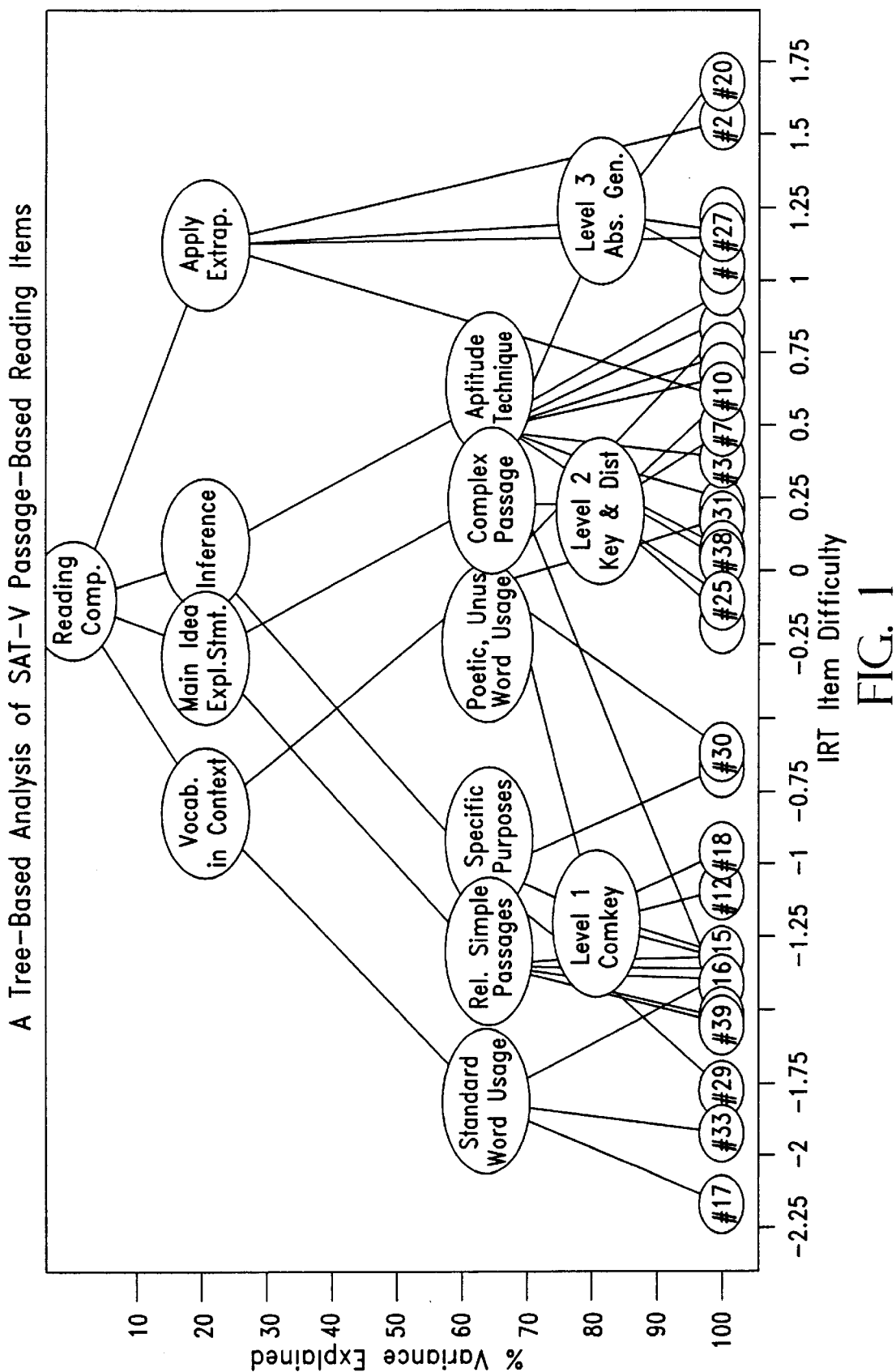
FIG. 1 shows the results of a tree-based analysis of SAT-V passage-based reading items.
Figure 3A:
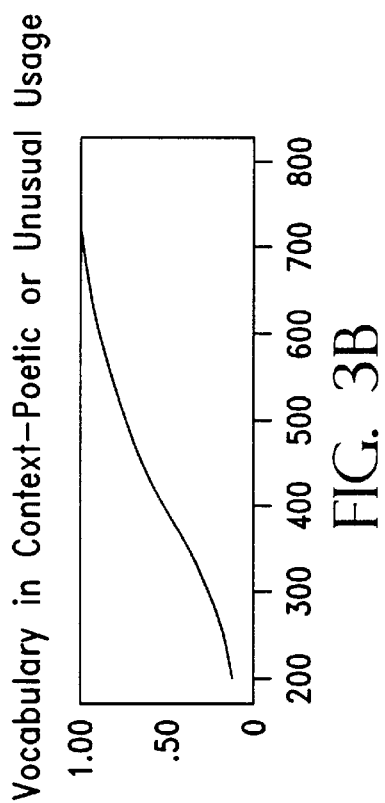
Figure 3B:
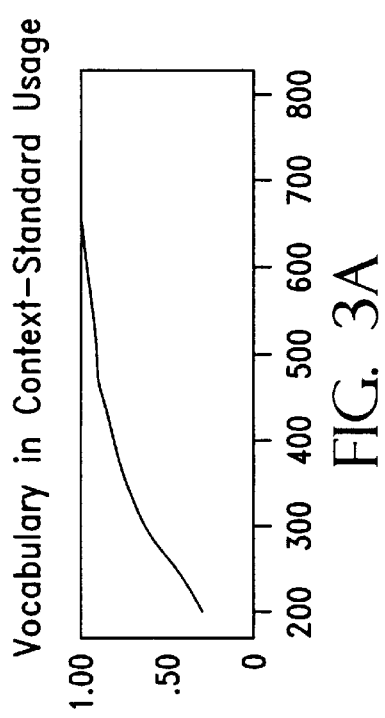
Figure 3C:
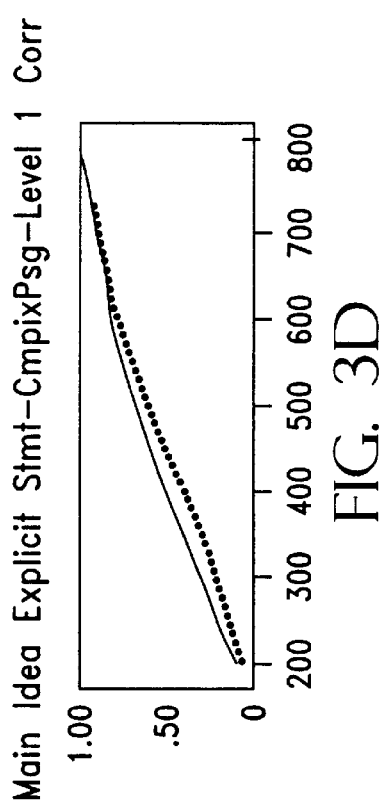
Figure 3D:
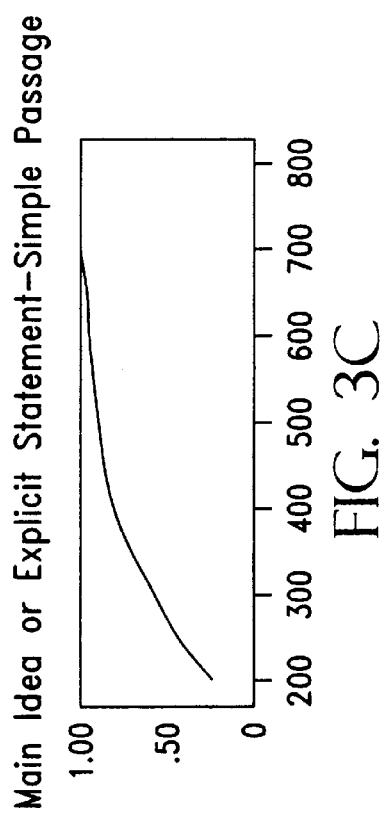

A method which meets the above-mentioned objects and provides other beneficial features in accordance with the presently preferred exemplary embodiment of the invention will be described below with reference to FIGS. 1–17. Those skilled in the art will readily appreciate that the description given herein with respect to those figures is for explanatory purposes only and is not intended in any way to limit the scope of the invention. Accordingly, all questions regarding the scope of the invention should be resolved by referring to the appended claims.

Introduction

A new diagnostic approach is described which provides both student- and group-level diagnoses. As in the Beaton and Allen approach described above, diagnoses are specified in terms of the combinations of skills needed to solve items located at increasingly higher levels on a test's reported score scale. As in the Bayesian inference network approach described above, multiple sources of information are considered when generating student-level skill mastery probabilities. As in the Lewis and Sheehan approach described above, mastery decisions are obtained by first specifying a loss function, and then using Bayesian decision theory to define a decision rule that minimizes posterior expected loss. The new approach is termed The Tree-Based Approach (TBA) because a tree-based regression procedure is used to determine the combinations of skills that constitute the target of both group- and student-level inferences.

In the following description, a rationale for the Tree-Based estimation strategy is provided, as well as a methodological illustration in which key aspects of the approach are described in the context of a specific application: determining the skills underlying performance on the reading comprehension subsection of the SAT I Verbal Reasoning test. An evaluation of model fit and a discussion of the advantages of the proposed approach is then provided.

In many testing situations, the skills needed to respond correctly to individual items sampled from the domain are not known precisely. Diagnostic systems designed to be implemented under these conditions must solve two different inferential problems: first, they must determine the specific combinations of skills to be considered in the analysis, and second, they must infer students' unobservable skill mastery patterns from their observable item response patterns (i.e., they must diagnose the current mastery status of individual students on individual required skills or individual combinations of required skills). The TBA of the invention treats these two tasks as distinct problems requiring distinct solutions.

Because students' observed item response vectors constitute the single most important data source for use in diagnosing students' individual skill mastery patterns, diagnostic systems have traditionally been designed to operate on student-level response data. Although this design decision is highly appropriate for the skill diagnosis problem, it does not necessarily follow that it is also appropriate for the skill identification problem. That is, it does not necessarily follow that individual item responses are needed, or even useful, for determining the combinations of cognitive skills underlying proficiency in a domain. In the solution proposed for the skill identification problem, individual items are viewed as the unit of analysis. In the solution proposed for the skill diagnosis problem, students' observed item response patterns are viewed as the unit of analysis. This strategy is designed to provide accurate student-level diagnoses even when the subsets of items presented to individual examinees do not provide adequate item representation in all important skill areas.

The Tree-Based estimation strategy involves first constructing a strong model of student proficiency and then testing whether individual students' observed item response vectors are consistent with that model. The student proficiency model is estimated in two steps. First, a tree-based regression analysis is used to model the complex nonlinear ways in which required skills interact with different item features to produce differences in item difficulty. Second, the resulting item difficulty model is translated into a student proficiency model by estimating the probability that students at specified score levels will respond correctly to items requiring specified combinations of skills. The skill combinations considered are those which were found to have the greatest impact on performance, as evidenced in the item difficulty model. The resulting student proficiency model is specified in terms of an r×k matrix of mastery probabilities where r is the number of points on the tests' reported score scale and k is the number of skill combinations identified in the tree-based analysis. Student-level diagnoses are subsequently obtained by comparing students' observed performances on items requiring the identified combinations of skills to the performances expected under the estimated proficiency model. This comparison is implemented using Lewis and Sheehan's Bayesian decision theory approach.

This approach to estimating student proficiency incorporates a number of advantages. First, because the combinations of skills associated with key differences in students' performances are determined from an analysis of IRT item difficulty parameters, items selected from many different test forms can be modeled simultaneously. Thus no matter how many items are administered to individual examinees on individual test forms, sufficient within-skill-area item representation can always by achieved by analyzing additional test forms. Second, because the item difficulty model is estimated using a tree-based regression approach, complex nonadditive behavior can be easily modeled. (Clark, L. A. and D. Pregibon, Tree-based models, in Chambers, J. M. and T. J. Hastie, Eds., Statistical models, Belmont, Calif.: Wadsworth and Brooks/Cole, pp. 377–378, 1992.) Third, because students' individual strengths and weaknesses are not evaluated until after the proficiency model has been estimated, individual student-level diagnoses can benefit from detailed prior information about the specific combinations of skills underlying performance at specific score levels.

In addition to providing detailed information about students' individual strengths and weaknesses, the TBA also provides a typical skill mastery pattern for each possible scaled score. The skill mastery patterns estimated for successive scores provide a cross-sectional view of proficiency that can be used to study changes in skill mastery over time. This information may help students and teachers distinguish between skill deficiencies which may be quickly remediated and skill deficiencies which may require extensive long-term instructional effort.

In any diagnostic investigation, the following fundamental questions must be answered: (1) what are the combinations of cognitive skills needed to solve items in the relevant domain? and (2) which of these skill combinations has each examinee mastered? The above description has demonstrated that the first fundamental question may be answered by using a tree-based regression technique to model the complex nonlinear ways in which required skills interact with different item features to produce differences in item difficulty.

There are numerous advantages to using a tree-based technique to answer this question. First, because the tree-based analysis can consider items selected from several different test forms simultaneously, the results will not be negatively impacted by the small within-skill area item sample sizes that are known to be typical of many large-scale educational assessments. Second, unlike other modeling approaches, the success of the tree-based approach is not dependent on detailed prior knowledge of important interaction effects. Third, unlike other modeling approaches, the tree-based approach also provides a precise description of the specific combinations of skills needed to solve items located at increasingly advanced levels on a test's underlying proficiency scale. Fourth, unlike other modeling approaches, the tree-based approach also provides the set of knowledge states underlying proficiency in a domain.

Turning to the second fundamental question, the above description has demonstrated that the skill combinations identified in a tree's terminal nodes form the basic building blocks needed to: (a) define a set of diagnostic subscores, (b) determine the skill mastery patterns underlying students observed response patterns, and (c) define a rule for diagnosing students' relative strengths and weaknesses.

A Rationale for the Tree-Based Estimation Strategy

For diagnostic systems designed to generate both group- and student-level diagnoses, two designs are possible: (1) the system could first generate student-level diagnoses for a large sample of examinees and then summarize that information to obtain group-level diagnoses; or (2) the system could use a procedure which operates on historical data to first generate group-level diagnoses and then use that information to obtain more accurate student-level diagnoses.

The first approach is illustrated in Tatsuoka, K.K., Architecture of knowledge structures and cognitive diagnosis, P. Nichols, S. Chipman & R. Brennan, Eds., Cognitively diagnostic assessment. Hillsdale, N.J.: Lawrence Erlbaum Associates, 1995, and Tatsuoka, K., M. Birenbaum, C. Lewis, & K. Sheehan, Proficiency scaling based on conditional probability functions for attributes, ETS Research Report No. RR-93-50-ONR, Princeton, N.J.: Educational Testing Service, 1993. That is, student-level diagnoses are estimated first and group-level diagnoses are subsequently obtained by summarizing available student-level diagnoses. Two things to note about this strategy are: (1) the accuracy of the group-level diagnoses is completely determined by the accuracy of the individual student-level diagnoses, and (2) the accuracy of the individual student-level diagnoses is determined by the validity of the hypothesized proficiency model and, to a very large degree, by the numbers of items administered to individual students in individual skill areas.

The TBA follows the second approach. That is, group-level skill mastery probabilities are estimated, not by summarizing available student-level skill mastery probabilities, but rather, by modeling the complex nonlinear ways in which required skills interact with different item features to produce differences in item difficulty. The resulting item difficulty model is translated into a student proficiency model by estimating the probability that students at specified score levels will respond correctly to items requiring specified combinations of skills. The skill combinations considered in the student proficiency model are those which were shown to have the greatest impact on performance, as evidenced in the item difficulty model.

If the true underlying proficiency model were known a priori, and students were always administered sufficient numbers of items in all important skill areas, then the two approaches described above might be expected to produce equally accurate results. In many testing situations, however, the true proficiency model is not known a priori, and the numbers of items administered to individual students in individual skill areas is not under the control of the diagnostic assessment system. As will be shown in the following illustration, the TBA includes a number of features that were specifically designed to allow accurate group and student-level diagnoses to be obtained, even under these more difficult conditions.

A Methodological Illustration

In this section, the TBA is described in the context of a specific application: generating proficiency interpretations for the reading comprehension subsection of the SAT I Verbal Reasoning Test. The data available for the analysis consisted of examinee response vectors collected for Form 3QSA01, an operational form of the SAT I Verbal Reasoning Test which was administered in March of 1994 and has since been disclosed. As is the case with all new style SATs, Form 3QSA01 contained a total of 78 verbal items: 40 passage-based reading comprehension items, 19 analogies, and 19 sentence completion items. Item difficulty estimates expressed in terms of the IRT three parameter logistic difficulty parameter, estimated by means of the LOGIST program, were available for all items. (The LOGIST program is described in Hambleton, R. K. and Swaminathan, H., Item Response Theory, Principles and Applications, Boston, Mass.: Kluwer-Nijhoff Publishing, pp. 147–149, 1985.)

A Three-Step Estimation Procedure

In a preferred embodiment, the TBA comprises the following three steps. First, a tree-based regression analysis is used to model the complex nonlinear ways in which required skills interact with different item features to produce differences in item difficulty. Second, a nonparametric smoothing technique is used to summarize student performance on the combinations of skills identified in the tree-based analysis. The resulting cluster characteristic curves provide the probability of responding correctly to items with specified skill requirements, expressed as a function of the underlying test score. Third, a variation of Lewis and Sheehan's Bayesian decision theory approach is used to compare examinees' observed cluster scores to the expected cluster scores derived from the cluster characteristic curves.

Step 1: Using Tree-Based Techniques to Determine Strategic Combinations of Skills Early attempts at using tree-based techniques to model item response data focused on explaining inter-item correlations. (Belier, M., Tree versus geometric representation of tests and items, Applied Psychological Measurement, vol. 14(1), pp. 13–28, 1990. Corter, J. E., Using clustering methods to explore the structure of diagnostic tests, in Cognitively diagnostic assessment, P. Nichols, S. Chapman, & R. Brennan, Eds., Hillsdale, N.J.: Erlbaum, 1995.) Sheehan & Mislevy showed that tree-based techniques could also be used to predict item characteristics (e.g., difficulty, discrimination and guessing) from information about item features. (Sheehan, K. M. & R. J. Mislevy, A tree-based analysis of items from an assessment of basic mathematics skills, ETS Research Report No. RR-94-14, Princeton, N.J.: Educational Testing Service, 1994.) In the TBA, tree-based techniques are used to identify clusters of items requiring strategically important combinations of skills.

The tree-based analysis requires two inputs: an (n×1) vector of IRT item difficulty estimates, and an (n×k) matrix of hypothesized skill classifications for each of n items on each of k skills. It is expected that (a) the n items considered in the analysis will have been selected from several different test forms, and (b) all of the IRT item difficulty estimates will have been scaled to a common proficiency metric. These hypotheses may have been generated through a number of different activities including (a) studies of the factors influencing item difficulty, (b) consultations with subject matter experts; and (c) analyses of tasks sampled from the domain.

Many researchers have demonstrated that expert judges hypotheses about the skills underlying proficiency in a domain can be validated by modeling item difficulty. (Sheehan, K. M., A tree-based approach to proficiency scaling and diagnostic assessment, Journal of Educational Measurement, vol 34, pp. 333–352, 1997; Sheehan, K. M. & R. J. Mislevy, A tree-based analysis of items from an assessment of basic mathematics skills, ETS Research Report RR-94-14, Princeton, N.J.: Educational Testing Service, 1994; Embretson, S. E., A measurement model for linking individual learning to processes and knowledge: Application to mathematical reasoning, Journal of Educational Measurement, vol. 32, pp. 277–294, 1995). Further support for that position will be set forth below to demonstrate that (a) when difficulty modeling is implemented within a tree-based framework, the resulting tree provides a comprehensive description of the specific combinations of skills needed to solve items located at increasingly advanced levels on the test's underlying proficiency scale, and (b) the skill combinations identified in a tree-based analysis form the basic building blocks needed to generate several different types of diagnostic feedback.

In typical large-scale educational assessments, the total number of items that can be included on an individual test form is limited by required test timing constraints. As a result, within-skill area item sample sizes tend to be quite small. When expert judges hypotheses about required skills are tested within an item difficulty modeling framework however, sufficient numbers of items in individual skill areas can always be achieved by analyzing additional test forms. Thus, validation approaches which fall within the item difficulty modeling paradigm can be expected to provide accurate results even when the within-skill area item sample sizes on individual test forms are not large. In addition, because the shorter, less comprehensive response vectors collected in an adaptative test can be expected to yield even smaller within-skill area item sample sizes, the sample size advantage of the item difficulty modeling approach can be expected to be even more pronounced when item responses are collected adaptively.

Like classical regression models, tree-based regression models provide a rule for estimating the value of the response variable (y) from a set of classification or predictor variables (x). In this particular application, y is the vector of IRT item difficulty estimates and x is the hypothesized item-by-skill matrix. The elements of x may be expressed on a binary scale (e.g. $x_{ij}=1$ if skill j is needed to solve item i, $x_{ij}=0$ otherwise), a multi-level categorical scale (e.g $x_{ij}=A$ if item i belongs to schema A, $x_{ij}=B$ if item i belongs to schema B), or a continuous scale (e.g. numeric measures of vocabulary difficulty). Unlike the prediction rules generated in the classical regression setting, tree-based prediction rules provide the expected value of the response for clusters of observations having similar values of the predictor variables. Clusters are formed by successively splitting the data, on the basis of the skill classification variables, into increasingly homogeneous subsets called nodes.

A locally optimal sequence of splits is selected by using a recursive partitioning algorithm to evaluate all possible splits of all possible skill classification variables at each stage of the analysis. (Brieman, L., J. H. Friedman, R. Olshen, and C. J. Stone, Classification and Regression Trees, Belmont, Calif.: Wadsworth International Group, pp. 216–264, 1984.) After each split is defined, the mean value of item difficulty within each offspring node is taken as the predicted value of item difficulty for each of the items in the respective nodes. The more homogeneous the node, the more accurate the prediction. Thus, the node definitions resulting from a tree-based regression analysis form a skills-based item clustering scheme which minimizes within-cluster variation while simultaneously maximizing between-cluster variation. As will be demonstrated below, the skill combinations identified in a tree's terminal nodes can be validated using classical least squares regression techniques.

To illustrate the approach, consider an item-by-skill matrix, x, consisting of a single binary-scaled skill classification. This input would result in the following tree-based prediction rule:

if $x_i=0$ then $\hat{y}_i=\bar{y}_0$ if $x_i=1$ then $\hat{y}_i=\bar{y}_1$ where $\bar{y}_0$, is the mean value of y calculated from all items coded as NOT requiring skill x (i.e., $x_i=0$), and $\bar{y}_1$ is the mean value of y calculated from all items coded as requiring skill x (i.e., $x_i=1$). Although this prediction rule could be used to generate a predicted value of item difficulty for each item, predicted item difficulties are not needed for diagnosis, so such predictions would not be generated. Instead, the prediction rule is used to define a skills-based item clustering scheme. The skills-based item clustering scheme implied by the simple prediction rule listed above is specified as follows: items coded as not requiring skill x (i.e., $x_i=0$) are classified into one cluster; items coded as requiring skill x (i.e., $x_i=1$) are classified into a second cluster.

Of course, single-column item-by-skill matrices are not likely to occur in practice. In typical analyses, 20, 25 or even 30 different skill classification variables will have to be considered. To handle problems of this size, tree-based regression algorithms typically employ a recursive partitioning algorithm to evaluate all possible splits of all possible predictor variables at each stage of the analysis. (Brieman, L., J. H. Friedman, R. Olshen, and C. J. Stone, Classification and Regression Trees, Belmont, Calif.: Wadsworth International Group, pp. 216–264,1984.) In the algorithm selected for use in this study, potential splits are evaluated in terms of deviance, a statistical measure of the dissimilarity in the response variable among the observations belonging to a single node. At each stage of splitting, the original subset of observations is referred to as the parent node and the two outcome subsets are referred to as the left and right child nodes. The best split is the one that produces the largest decrease between the deviance of the parent node and the sum of the deviances in the two child nodes. The deviance of the parent node is calculated as the sum of the deviances of all of its members, $$D(y,\hat{y})=\Sigma(y_i-\hat{y})^2$$

where $\hat{y}$ is the mean value of the response calculated from all of the observations in the node. The deviance of a potential split is calculated as $$D_{split}(y, \hat{y}_L, \hat{y}_R) = D(y, \hat{y}_L) + D(y, \hat{y}_R)$$
$$= \sum_L (Y_i - \hat{y}_L)^2 + \sum_R (y_i - \hat{y}_R)^2$$

where $\hat{y}_L$ is the mean value of the response in the left child node and $\hat{y}_R$ is the mean value of the response in the right child node. The split that maximizes the change in deviance $$\Delta D = D(y,\hat{y}) - D_{split}(y,\hat{y}_L,\hat{y}_R)$$

is the split chosen at any given node.

Most tree-based regression algorithms can also accommodate user-specified Splits. The TBA employs a user-specified split to force the algorithm to define the first split in terms of a schema classification variable. As noted in Sheehan (1997), instructionally-relevant information about the skills underlying performance in a domain of interest can sometimes be more easily extracted if the available items are first grouped according to required planning and goal-setting techniques. These groups are termed schemas. It is assumed that the schema classification developed for use in the TBA will have the following properties: (1) items classified into the same schema will require similar planning and goal-setting techniques and will share the same problem structure, but may vary in difficulty, and (2) items classified into different schemas will either require different skills, or will require application of the same skills in slightly different ways, or in slightly different combinations. The schema classifications developed for the current application are summarized below.

(1) Vocabulary in Context. Items in this schema test vocabulary skill using a specific problem format: the item stem references a word or phrase in the text and the option list provides a series of alternative plausible substitutions. Successful solution involves two steps: First, the text surrounding the referenced word is analyzed to determine the author's intended meaning, and second, the option word (or phrase) which best preserves that meaning is determined.

(2) Main Idea and Explicit Statement. Items in this schema test specific or global understanding of points which have been explicitly treated in a reading passage. As noted in Kirsch, I. S. and P. B. Mosenthal, Exploring document literacy: Variables underlying the performance of young adults, Reading research Quarterly, vol. 25, pp. 5–30, 1990, appropriate solution strategies depend on the degree to which the information presented in the item text shares semantic features with the information presented in the referenced reading passage. Items with large amounts of semantic overlap may be solved by matching features in the correct option to features in the referenced reading passage. Items with little or no overlap can only be solved by fully comprehending the author's point, argument or explanation.

(3) Inference About An Author's Underlying Purpose, Assumptions, Attitude or Rhetorical Strategy. Items in this schema test whether a student has understood "why" or "how" something was said (as opposed to "what" was said). Typical items ask the student to infer an author's reasons for including a particular quote or example in a reading passage, or probe for understanding of the specific techniques used by the author to accomplish some specified rhetorical objective.

(4) Application or Extrapolation. Items in this schema ask the student to determine which of several alternative applications or extrapolations are best supported by the information provided in the passage.

Evaluating Alternative Clustering Solutions

The item clustering solution produced by a tree-based analysis may be evaluated by comparing it to a worst case alternative and a best case alternative. In this particular application, the worst case alternative corresponds to a clustering solution in which none of the required skills has been differentiated. That is, each item is assumed to be testing a single, undifferentiated skill and, consequently, all items are classified into a single cluster. By contrast, the best case alternative corresponds to a clustering solution in which all of the required skills have been determined. This case can be simulated by assuming that each item is testing a unique combination of skills. Thus, each item is classified into a unique cluster and the number of clusters is equal to the number of items. Note that, although this clustering solution is labeled "best" it is actually only best in the sense of explaining the maximum possible amount of variation in item difficulty. The clustering solution which would be considered "best" for diagnostic purposes would be one which accounted for a similar proportion of the observed variation in item difficulty while defining clusters in terms of required skills.

A Clustering Solution for the SAT Verbal Data

The tree-based analysis of the SAT passage-based reading items is displayed in FIG. 1. In this particular display, each node is plotted at a horizontal location determined from its predicted difficulty value and a vertical location determined from the percent of variation explained by the specified sequence of splits. The root node at the top of the tree corresponds to the worst case scenario in which all items are classified into a single cluster. The smaller sized nodes at the bottom of the tree correspond to the "best" case scenario in which each item is classified into its own cluster. Thus, the tree-based clustering solution is displayed within the bounds determined by the worst case scenario (0% of the difficulty variance explained) and the best case scenario (100% of the difficulty variance explained).

As shown in FIG. 1, the first split divides the items into the four reading comprehension schemas. Reading from the vertical axis, one can see that this split accounts for about 20% of the observed variation in item difficulty. To account for additional variation in item difficulty, each of the four schema nodes are subsequently split into two or more offspring nodes. For example, additional variation in the Vocabulary in Context schema is explained by dividing the items into subsets defined to reflect differences in word usage. Items rated as employing standard word usage are classified into one node and items rated as employing poetic/unusual word usage are classified into a second node. As indicated by the node locations, items classified into the "Standard Usage" node are predicted to be less difficult than the items classified into the "Poetic/Unusual Usage" node.

To further illustrate the kinds of skill classifications considered in the analyses, this section describes the variables selected to explain additional variation in the Main Idea and Explicit Statement schema. As shown in FIG. 1, the first split is defined in terms of a passage-level variable: items referring to passages classified as having a relatively simple idea structure are assigned to one node and items referring to passages classified as having a relatively complex idea structure are assigned to a second node. Although the "Simple Passage" node forms a relatively tight cluster with little unexplained variation, the "Complex Passage" node is quite disperse, with items spanning almost the full range of difficulty values. Subsequent splits of the "Complex Passage" node are defined in terms of the Degree of Correspondence variable, an item-level variable which was originally proposed by Kirsch & Mosenthal. (Kirsch, I. S. and P. B. Mosenthal, Exploring document literacy: Variables underlying the performance of young adults, Reading research Quarterly, vol. 25, pp. 5–30, 1990). After studying the processes used by young adults to solve document literacy items, Kirsch & Mosenthal noted that: (1) many reading comprehension items can be solved by matching features in the item text to features in the passage that the item refers to, and (2) items requiring a feature matching strategy will be more or less difficult to solve depending on the degree of correspondence between the phrasing used in the item text and the phrasing used in the passage. For the present study, the five degree of correspondence levels proposed by Kirsch & Mosenthal were collapsed to three. These three levels are defined as follows:

Level 1: The correspondence between features in the text and features in the correct option is literal or synonymous or can be established through a text-based inference AND such correspondence does not exist for any of the incorrect options.

Level 2: The correspondence between features in the text and features in the correct option is literal or synonymous or can be established through a text-based inference AND such correspondence also exists for at least one of the incorrect options.

Level 3: The correct option is presented in an abstract fashion which effectively eliminates solution through a feature mapping strategy. Solution requires skill at evaluating the truth status of alternative abstractions or generalizations.

As shown in FIG. 1, different skills are important in each schema. This suggests that the SAT reading comprehension data would not be well fit by a linear model which required each skill to have the same effect on item difficulty, regardless of the item's schema classification.

Practical Considerations in Model Selection

A regression tree provides the sequence of splits which accounts for the largest decrease in total observed variation. A tree with k terminal nodes can be translated into a tree with k−1 terminal nodes by removing a single split at the bottom of the tree. This process is called pruning. Because the two terminal nodes created by a specific split will always have a common parent, pruning is equivalent to collapsing pairs of terminal nodes with common parents.

Pruning provides a straight-forward method for introducing practical considerations into the model selection process. In particular, pruning can be used to evaluate the effect of collapsing terminal nodes associated with skills that are either difficult to code or difficult to explain to students. According to the invention, it is desirable to evaluate the effect of collapsing Levels 1 and 2 of the Degree of Correspondence variable because the skill descriptions associated with these two terminal nodes differed only in distractor characteristics. Therefore, two different tree-based solutions are considered below: (1) a solution in which the distinction between Levels 1 and 2 of the Degree of Correspondence variable is maintained, and (2) a solution in which these two terminal nodes are collapsed to their common parent node.

Step 2: Generating Group-Level Proficiency Profiles

A tree-based item difficulty model can be translated into a student proficiency model by summarizing student performance on clusters of items requiring the combinations of skills identified in the tree's terminal nodes. The tree presented in FIG. 1 contains nine terminal nodes. If the nodes corresponding to Levels 1 and 2 of the Degree of Correspondence variable were collapsed, the tree would then contain eight terminal nodes. The skill combinations identified in the nine-node solution are summarized in FIGS. 2A and 2B. FIGS. 2A and 2B also provide sample items and node labels. The node labels can be used to link the skill descriptions provided in FIGS. 2A and 2B to the graphical presentation provided in FIG. 1. The skill descriptions are labeled "preliminary" because it is expected that analyses of additional forms will indicate one or more areas requiring revision.

A file of 100,000 randomly selected examinee response vectors was available for summarizing student performance on the identified skill combinations. This file was reduced to a more manageable size by randomly selecting at most 250 examinees at each of the 61 reported score points between 200 and 800, inclusive. In this manner, a reduced file of 13,251 examinees, evenly distributed throughout the ability range with no more than 250 examinees at any one score point, was produced.

The relationship between examinees' observed percent correct scores in each cluster and their reported scaled scores was estimated using a locally weighted scatter-plot smoothing (LOWESS) approach (Cleveland, W. S., Grosse, E. & Shyu, W. M., Local regression models, J. M. Chambers & T. J. Hastie, Eds., Statistical models in S, Pacific Grove, Calif.:Wadsworth & Brooks/Cole, pp. 312–314, 1992). The resulting curves provide the probability of responding correctly to items requiring the identified combinations of skills expressed as a function of the underlying scaled score. The cluster characteristic curves estimated for the SAT reading comprehension data are presented in FIGS. 3A–I. Two curves are provided for Levels 1 and 2 of the Degree of Correspondence variable: the solid curve is the curve obtained before collapsing, the dashed curve is the curve obtained after collapsing. Note that all of the curves are mostly increasing and bounded at one.

The LOWESS curves shown in FIGS. 3A–3I provide expected skill mastery probabilities for examinees at each possible reported score point. Thus, the student proficiency model is specified in terms of a r×k matrix of mastery probabilities, where r is the number of reported score points and k is the number of clusters. To illustrate, FIGS. 4A and 4B list the skill mastery probabilities estimated for examinees at three selected score levels: 400, 450 and 500.

Graphical Presentation of the Results

The group-level proficiency profiles determined from the cluster characteristic curves can be communicated to students, parents, teachers and counselors using a bar chart format, as shown in FIG. 5. This particular chart combines two sets of results: the results obtained for the reading comprehension items, as described above, and the results obtained in a separate analysis of sentence completion items and analogies. The chart displays mastery probabilities for eleven nonoverlapping skill combinations. Of these eleven, eight represent the skill combinations described in FIGS. 1, 2A, and 2B (with Skills D and F collapsed), and three represent skills that were only found to be relevant for sentence completion items and analogies. As can be seen, different shades of grey are used to indicate the mastery probabilities estimated for each skill area.

Step 3: Generating Student-Level Diagnoses

The strategy for generating student-level diagnoses follows the standard statistical procedure of first constructing a model and then testing whether the observed data is consistent with that model. An individualized proficiency model is constructed for each student by assuming that their observed proficiency profile (i.e. their observed percent correct in each skill area) is equal to the group-level profile estimated for their particular score-level. FIG. 6 illustrates this approach for a student selected from among the examinees on the SAT I Verbal Reasoning Test described above in connection with FIG. 1. This particular student received an SAT verbal score of 460, so her performance is being compared to the typical skill mastery profile estimated for all students at the 460 score level.

The typical performance intervals shown for the various skill areas can be constructed by applying the Bayesian decision theory procedure detailed in Lewis, C. & K. M. Sheehan, Using Bayesian decision theory to design a computerized mastery test, Applied Psychological Measurement, vol. 14, pp. 367–386, 1990, and Sheehan, K. M. & C. Lewis, Computerized mastery testing with nonequivalent testlets, Applied Psychological Measurement, vol. 16, pp. 65–76, 1992. This approach assumes that the mastery level to be considered for any skill area is known, but that there is some uncertainty about whether a given student's observed response vector places her above or below that mastery level. The mastery levels needed for the current application are determined from the appropriate cluster characteristic curves. For example, in diagnosing performance on Skill E, "Understand expressions containing secondary word meanings or poetic usage", the mastery level estimated for all students at the 460 level is 61%. However, as shown in FIG. 6, an individual examinee's observed cluster score is expected to vary somewhat about that estimate. The amount of "allowable" variation is determined by first specifying a loss function and then estimating the upper and lower percent correct cut points that minimize posterior expected loss. Thus, the lower endpoint represents the highest observed percentage at which we would be willing to decide that the student's mastery level was truly lower than the typical mastery level, and the upper endpoint represents the lowest observed percentage at which we would be willing to decide that the student's mastery level was truly higher than the typical mastery level. Consequently, individual estimates plotted below the typical performance interval are an indication of a relative weakness and individual estimates plotted above the typical performance interval are an indication of a relative strength. As can be seen in FIG. 6, Student #29 appears to have one relative strength and three relative weaknesses.

How Well Does the Estimated Proficiency Model Fit the Data?

Wright noted that any psychometric model may be evaluated by comparing examinees' observed item responses to the probabilities of correct response determined from the model. (Wright, B. D., Solving measurement problems with the Rasch model, Journal of Educational Measurement, vol. 14, pp. 97–116, 1977). Following Wright, let $e_{ij}$ represent Examinee j's observed residual on Item i, calculated as follows $$e_{ij}=x_{ij}-m_{ij},$$

where $x_{ij}$ is the examinee's observed response (1 if correct, 0 if incorrect) and $m_{ij}$ is the probability of a correct response determined from the proposed proficiency model. In the current application, it is useful to compare the fit of a number of different models: (1) a model in which all items are assumed to be testing a single skill or ability, (i.e. the worst case scenario in which all items are classified into a single cluster), (2) the two models implied by the tree-based clustering analysis, and (3) a model in which each item is assumed to be testing a unique skill (i.e. the "best" case scenario in which each item is classified into its own cluster.) The $m_{ij}$'s needed to evaluate these alternative models are available from the appropriate cluster characteristic curves. For example, FIGS. 4A and 4B list the $m_{ij}$'s needed to evaluate the 9-cluster tree-based solution, for examinees at three different score levels: 400, 450 and 500. Although not included in FIGS. 4A and 4B, the $m_{ij}$'s needed to evaluate data provided by examinees at other score levels are readily available. To obtain the $m_{ij}$'s needed to evaluate the worst case solution, the cluster characteristic curve associated with a one-cluster solution must first be estimated. In standard IRT terminology this curve is called a Test Characteristic Curve or TCC. The $m_{ij}$'s needed to evaluate the best case solution can be obtained by estimating a cluster characteristic curve for each item. In standard IRT terminology these curves are called Item Characteristic Curves or ICCs.

The residuals estimated for the SAT-V clusters are summarized in FIG. 7. As can be seen, the sums of squared residuals obtained for both the 8-cluster solution and the 9-cluster solution are much smaller than the sum obtained for the worst case scenario (1 TCC) and not that much larger than the sum obtained for the "best" case scenario (40 ICCS). These results suggest that the tree algorithm has been successful at determining the combinations of skills needed to score at increasingly higher levels on the SAT-V scale. In addition, there is very little difference between the eight-cluster solution and the nine-cluster solution. This suggests that a decision to collapse Levels 1 and 2 of the Degree of Correspondence variable would not lead to a substantial decrease in model fit.

The percent of variation accounted for by a specified clustering solution can be calculated as follows:

$$p_C=100\times(TSS-RSS_C)/(TSS-RSS_B)$$

where TSS is the Total Sum of Squares obtained by setting each $m_{ij}$ equal to $\bar{p}$, the average probability of a correct response calculated over all examinees and all items, as follows $$\bar{p} = \frac{1}{Nn}\sum\sum x_{ij},$$

and $RSS_C$ and $RSS_B$ represent the residual sums of squares obtained under the specified clustering solution and the "best case" clustering solution, respectively. Note that, in the best case scenario, $RSS_C=RSS_B$, so $p_C$ will be 100. As shown in FIG. 7, the value of $p_C$ estimated for the eight cluster solution is 90% and the value estimated for the nine-cluster solution is 91%. Thus, both solutions account for a fairly large proportion of the "explainable" variation in students observed item response vectors.

Translating Continuously-Scaled Item Attributes Into Binary-Scaled Item Attributes In some applications, important item attributes are expressed on continuous scales. For example, the Breland Word Frequency Index (BWF, Breland, H. M. & L. M. Jenkins, English word frequency statistics: Analysis of a selected corpus of 14 million tokens, New York, N.Y.: The College Board, 1997) which measures the vocabulary skill level needed to respond correctly to an SAT verbal item is expressed on a continuous scale. In order to incorporate BWF information into subsequent diagnostic applications, the index must first be translated into a binary-scaled item attribute. This section describes how the tree-based approach can be used to translate a continuously-scaled item attribute into a binary-scaled item attribute.

The data available for the analysis consisted of the 19 analogy items on the March 1994 SAT I Verbal Reasoning Test described above. Item difficulty estimates expressed in terms of the IRT three parameter logistic difficulty parameter, estimated by means of the LOGIST program were available for all items. Information about the vocabulary skill level needed to solve each item was also available. This information was expressed in terms of the Breland Word Frequency value for the least frequent word in the item stem or key. (Breland, H. M. & L. M. Jenkins, English word frequency statistics: Analysis of a selected corpus of 14 million tokens, New York, N.Y.: The College Board, 1997.)

Figure 8A:
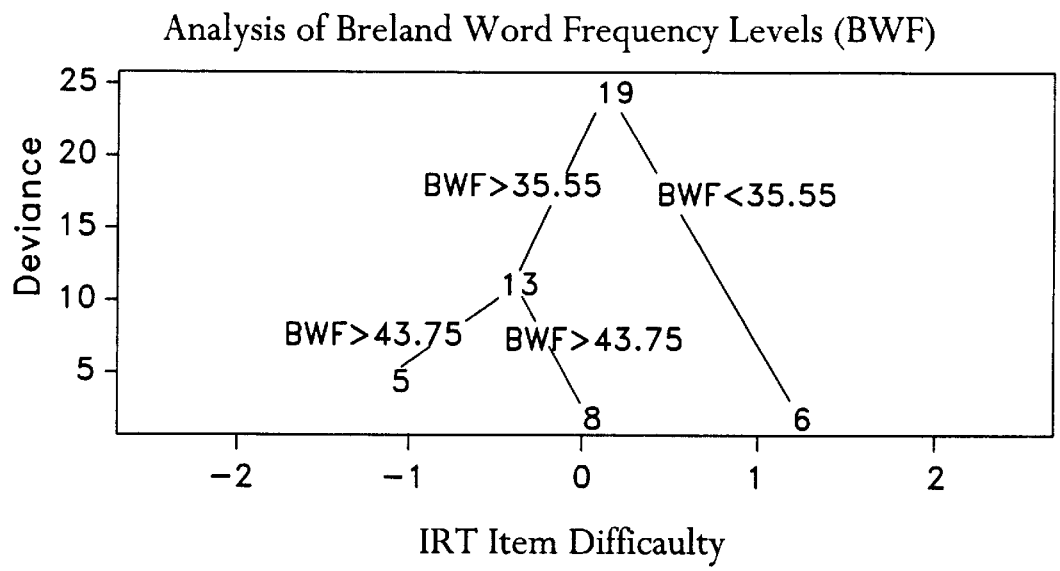
FIGS. 8A and 8B summarize the results of a tree-based analysis of the 19 analogy items on a disclosed form of the SAT I Verbal Reasoning Test.
Figure 8B:
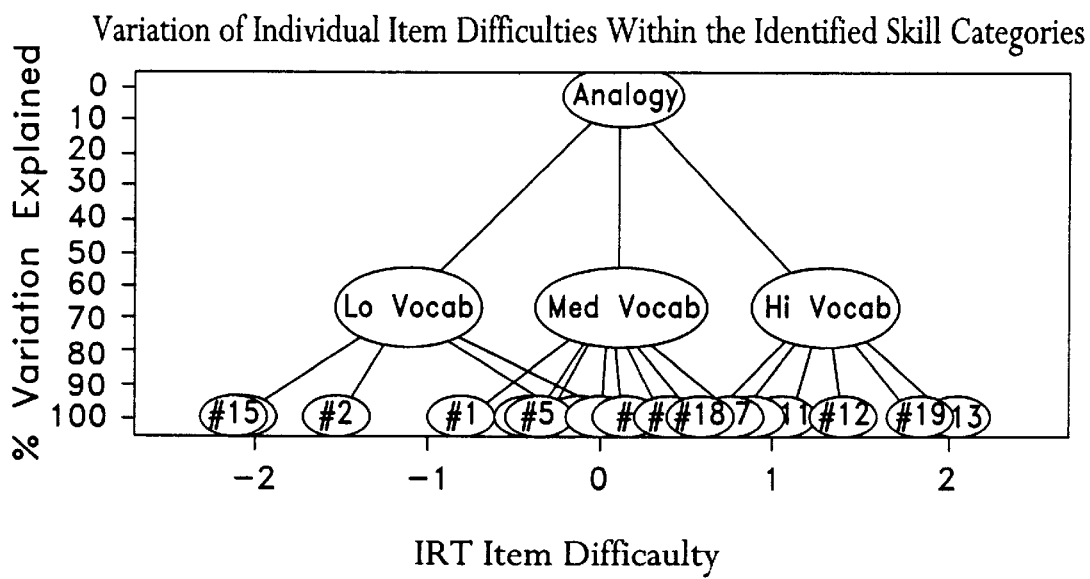

FIGS. 8A and 8B summarize the results of a tree-based analysis of this data. FIG. 8A shows how variation in required word frequency level relates to variation in resulting item difficulty. As can be seen, items with BWFs greater than 43.75 tend to be fairly easy,
items with BWFs between 43.75 and 35.55 tend to have middle difficulty values, and
items with BWFs less than 35.55 tend to be very difficult.

The BWF cut points listed above (and in the tree diagram) were determined by evaluating the prediction errors associated with all possible alternative cut points applied to this particular set of 19 items using the algorithm described in Brieman, L., J. H. Friedman, R. Olshen, and C. J. Stone, Classification and Regression Trees, Belmont, Calif.: Wadsworth International Group, pp. 216–264, 1984. The resulting cut points are "optimal" in the sense that they provide the greatest decrease in observed item difficulty variation for this particular set of 19 items. Clearly, a different set of items would have yielded a different set of "optimal" cut points. Thus, although the current cut points are not globally optimal, the analysis has demonstrated that a globally optimal set of cut points could easily be obtained: simply reestimate the tree using a large, representative set of items (preferably, the entire SAT I analogy pool). The cut points resulting from such an analysis would provide the optimal classification of items into discrete vocabulary skill categories. It should be noted that the number of skill categories considered in the tree-based analysis is completely a function of the data. The fact that the current analysis yielded three skill categories means that further subdivisions would have resulted in a reversal of the relationship between word frequency and resulting item difficulty (e.g. items requiring more advanced vocabulary skill would have been predicted to be less difficult rather than more difficult). The number of categories considered in the analysis is the largest number possible given the observed data.

This information, coupled with a large number of student-level response vectors, would allow for estimation of the vocabulary skill level achieved by individual students, and the vocabulary skill level needed to score at selected points on the SAT I Verbal scale.

FIG. 8B provides an alternative view of the same tree. This alternative view has been constructed to emphasize the fit of the data to the model. Large ovals represent tree-based model predictions and small ovals represent observed item difficulty values. The plot shows how individual item difficulty values are distributed within the previously identified skill categories. Note that the distribution of item difficulty values within the "Low Vocabulary Skill" category appears to be bimodal. This indicates that some of the items with low vocabulary demand require an additional skill which has not yet been identified. This additional skill could be identified by analyzing the two flagged items. However, since these two items could possibly share several different required skills, it would not be possible to pinpoint the one skill (or the one skill combination) which uniquely contributes to the identified difficulty increment without looking at a large number of additional items. These results demonstrate that the response vectors collected in large-scale educational assessments do not typically provide sufficient numbers of items in individual skill areas to reliably identify all of the skills needed to explain variation in students' observed performances and, consequently, procedures designed to identify required skills must be capable of accommodating several different forms of data simultaneously.

Identifying the Knowledge States Underlying Proficiency in a Domain

Certain diagnostic applications require information about the skill mastery patterns expected in a student population of interest. These expected skill mastery patterns are termed knowledge states. This section describes how the Tree-Based Approach can be used to determine the knowledge states underlying proficiency in a domain. To indicate how the Tree-Based approach differs from other exisiting approaches, the Tree-Based Approach is compared to the Boolean approach described in Tatsuoka (1995).

The Boolean approach can be summarized in terms of the following two steps. First, expert judges specify the skills needed to respond correctly to each of the items on a specified test form. These hypotheses are collected in the form of an (n×k) item-by-skill matrix, where n is the number of items and k is the number of hypothesized skills. Second, a Boolean procedure is used to generate the set of all possible subsets of mastered skills. If the number of hypothesized skills is large then the Boolean procedure uses information derived from the hypothesized item-by-skill matrix to identify the set of all states that are detectable with the given matrix.

For example, consider an assessment requiring 20 distinct skills. The complete set of all possible knowledge states in this domain would include $2^{20}=1,048,576$ states, too many to consider, much less enumerate. However, if the item-by-skill matrix indicated that every item that required mastery of Skill 10 also required mastery of Skill 9, then all states which paired nonmastery of Skill 9 with mastery of Skill 10 could be excluded from further consideration. Thus, the Boolean procedure is designed to locate all states that are detectable with the current test form.

One thing to note about this procedure is that it is not informed by any information which might be derived from the observed item response data. That is, because the only input to the procedure is the hypothesized item-by-skill matrix, potentially informative patterns in the observed data are not considered in any of the calculations.

The Tree-Based Approach for determining the knowledge states underlying proficiency in a domain can be summarized in terms of the following three steps. First, expert judges specify the skills needed to respond correctly to sets of items selected from several different test forms. These hypotheses are collected in the form of an (n×k) item-by-skill matrix, where n is the number of items and k is the number of hypothesized skills. Second, a tree-based regression technique is used to determine the combinations of cognitive skills underlying performance at increasingly advanced levels on the underlying total test scale. Third, a Boolean procedure is used to generate the set of all possible subsets of skill combinations that could have been mastered by an individual examinee.

This approach differs from Tatsuoka's (1995) Boolean approach in several important respects. First, although the computationally intensive Boolean approach does not consider any observed data, the tree-based approach is designed to search for, and incorporate, all significant skill-mastery patterns that can be determined from the available item difficulty data. Second, although the Boolean approach is form dependent, the proposed approach is virtually form independent. That is, the set of knowledge states obtained with the Boolean approach excludes all states which might have been observed with a different form, but could not have been observed with the current form. By contrast, the Tree-Based approach provides all of the knowledge states which could have been observed, given the collection of forms considered in the analysis. Since there is no limit to the number of forms which can be considered in an analysis, the proposed approach is virtually form independent. Third, although the Boolean approach cannot capture states involving significant interaction effects if those effects are not specified in advance, the Tree-Based approach automatically incorporates all identified interaction states. Thus, although the success of the Boolean procedure is critically dependent on detailed prior knowledge of the precise nature of the true underlying proficiency model, the success of the Tree-Based approach is not.

In the following section, these two procedures for determining the set of knowledge states underlying proficiency in a domain are compared. The comparison considers data collected in a recent study of the skills needed to solve GRE quantitative word problems.

The GRE Problem Variant Data

In an analysis of quantitative word problems selected from the Graduate Record Exam (GRE), Enright, Morley, and Sheehan found that, among items involving rate stories, item difficulty was significantly influenced by three factors: (1) whether the problem required the student to manipulate numbers or variables, (2) the number of constraints involved in the problem solution, and (3) the underlying schema tapped by the problem (e.g., Distance=Rate×Time (DRT), or Total Cost=Unit Cost×Units Purchased). (Enright, M. K., M. Morely, & K. Sheehan, Items by Design: The impact of systematic feature variation on item statistical characteristics, ETS Report GRE No. 95-15, Princeton, N.J.: Educational Testing Service, 1998).

Figure 9:
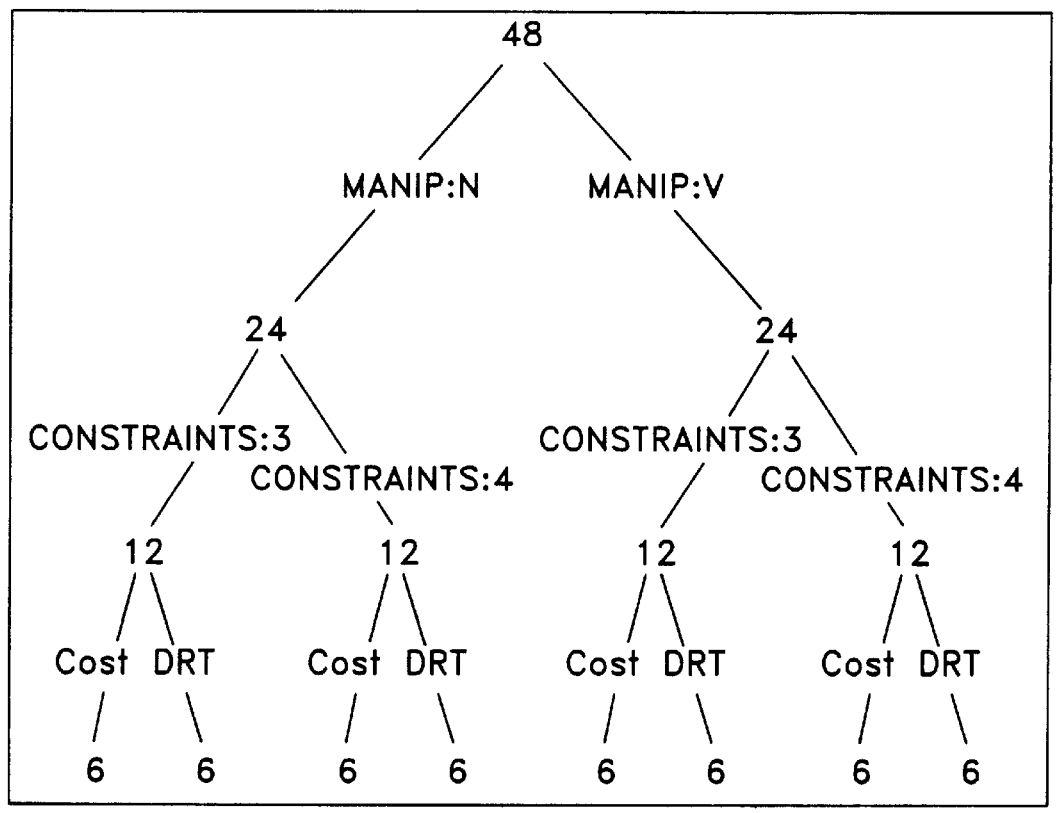
FIG. 9 shows a design matrix used to generate 48 GRE problem variants considered in a study by Enright et al.

In order to confirm that these three factors could be used to reliably manipulate the difficulty of GRE rate problems, 48 systematic item variants which differed only with respect to these three factors were created. That is, the items were constructed to be as similar as possible except for the manipulated factors. The numbers of items developed in each experimental category are shown in FIG. 9. As can be seen, the design was completely balanced, yielding a total of six items in each experimental condition.

To obtain item difficulty information equivalent to that obtained for operational GRE items, these 48 item variants were included in a series of embedded pretest sections which were administered as part of the October 1996 and December 1996 operational GRE administrations. Since the items were intentionally constructed to be similar, only two items from the set of 48 were included in the pretest section presented to each examinee. As is usually the case with operational GRE items, each pretest section was administered to approximately 1,500 examinees. Thus, a total of 24×1,500=36,000 student-level response vectors were considered in the study. This data was calibrated using a three parameter Logistic IRT model and the BILOG item calibration program. (The BILOG program is described in Hambleton, R. K. and Swaminathan, H., Item Response Theory, Principles and Applications, Boston, Mass.: Kluwer-Nijhoff Publishing, pp. 147–149, 1985.)

The Boolean Approach Applied to the GRE Problem Variant Data

It is useful to evaluate the significance of the hypothesized skills before implementing the Boolean procedure. Following Tatsuoka (995), the GRE problem variant data were analyzed using a classical least squares regression approach. In this analysis, the dependent variable was the IRT item difficulty estimate obtained in the BILOG calibration and the independent variables were a set of dummy variables coded to reflect the three factors manipulated in the study. The regression results are summarized in FIG. 10. As can be seen, each of the manipulated factors contributed significantly to item difficulty. Together, the three manipulated factors accounted for 83% of the observed variation in item difficulty.

The results shown in FIG. 10 were used to construct a list of the skills (also called attributes) needed to solve GRE rate problems, as follows A1: Solve story problems requiring operations on numbers A2: Solve story problems requiring operations on variables A3: Solve Cost problems A4: Solve DRT problems A5: Solve problems requiring 3 constraints A6: Solve problems requiring 4 constraints The Boolean procedure was then used to generate the list of all possible ubsets of mastered skills that could be detected with the given item-by-skill matrix. Because the item-by-skill matrix was completely crossed (by construction) every skill appeared with every other skill in at least six items. Thus, all states were detectable and the procedure yielded a total of 64 states.

FIG. 11 lists three of the 64 states. As can be seen, each state indicates the subset of skills that an examinee in that state would be expected to have mastered and the subset of skills that an examinee in that state would be expected to have failed to master.

The Tree-Based Approach Applied to the GRE Rate Problem Variant Data

In the tree-based approach of the invention, a tree-based regression technique is used to determine the combinations of cognitive skills underlying proficiency in the domain. These skill combinations are then validated via a classical least squares regression analysis. The tree estimated for the GRE problem variant data is shown in FIG. 12.

Figure 12:
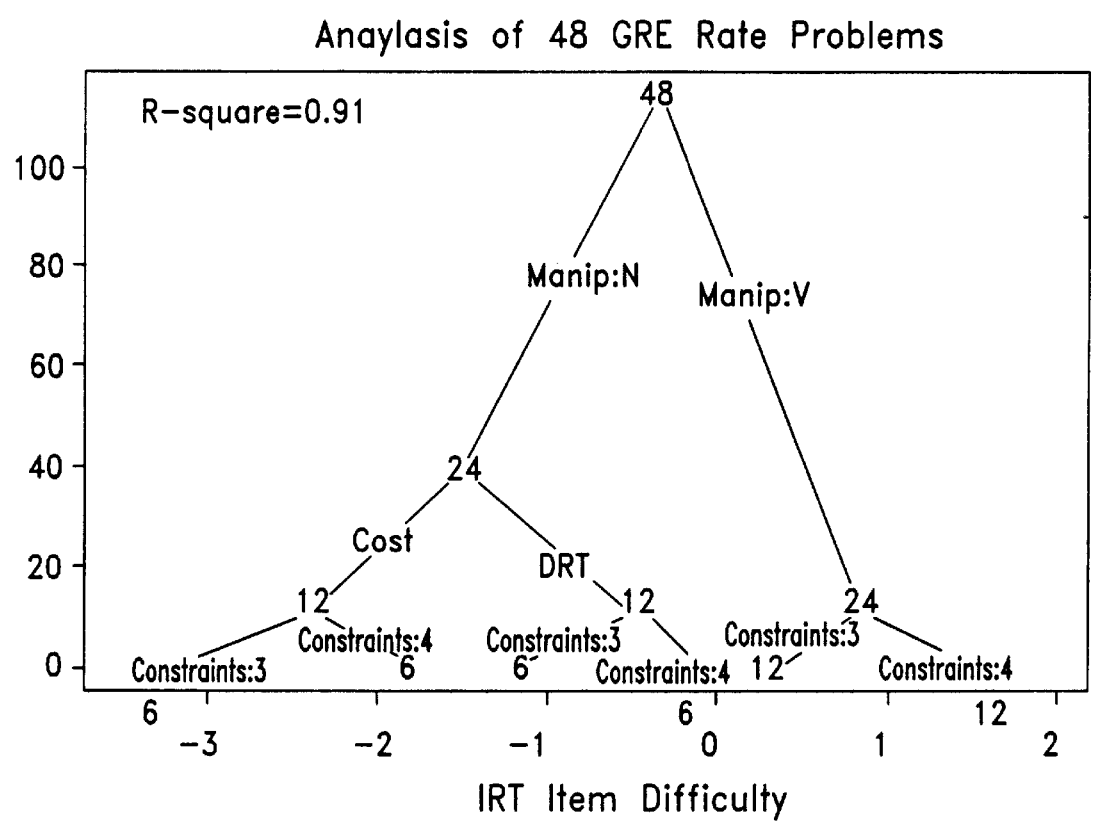
FIG. 12 shows the results of a tree-based analysis of the GRE problem variant data from the Enright et al. study.

The GRE problem variant tree shown in FIG. 12 suggests that:

(1) The manipulation which had the greatest impact on item difficulty involved respecifying the item so that the student was required to perform operations on variables as opposed to numbers. For each of the items in this condition, the problem constraints were expressed in terms of variables (e.g. "Let y be the distance from Juanita's house to town") and the correct answer was also phrased in terms of a variable (e.g. "3.5 y+2") rather than an actual number (e.g. 32 miles).

(2) Among the subset of items which did not require operations on variables, items involving the Distance=Rate×Time (DRT) schema were more difficult than items involving the Cost schema, but among the subset of items which did require operations on variables, items in the Cost and DRT schemas turned out to be equally difficult. This suggests that examinees at the higher ability levels (i.e. those who had some hope of solving the Manipulate with Variables problems) recognized the algebraic similarities in the Cost and DRT schemas, but that examinees at the lower ability levels did not.

(3) The presence of a fourth constraint contributes additional difficulty at all levels of proficiency. Thus, it is not the case that students who have learned to handle four constraints when dealing with one type of problem will necessarily also be able to handle four constraints when dealing with another type of problem. Rather, facility with four constraints must be remastered with each new type of problem tackled.

The insights gleaned from the tree-based analysis were validated using a classical least squares regression technique. The effect of recoding the Schema=DRT variable so that its effect is estimated separately within the Manipulate Numbers category and the Manipulate Variables category is shown in FIG. 13. As can be seen, the estimated coefficients confirm that the DRT effect is only significant among items in the Manipulate Numbers category. In addition, the revised model is more highly predictive of item difficulty: the explained variation has increased from 83% to 90%.

Because the items in this study were specifically designed to differ only with respect to the manipulated variables, its likely that much of the unexplained variation is due to measurement error. Thus, these results suggest that difficulty models estimated from items similar to the items considered in the Enright et al. study may provide accurate descriptions of required skills even when the percent of explained variation is as low as 90%.

Successive branches of the tree are determined by selecting splits which provide the greatest decrease between the deviance of the parent node and the sum of the deviances in the two offspring nodes. Thus, a tree's terminal nodes provide the classification of items into skill categories which is most consistent with the observed difficulty ordering of the items. Because the observed difficulty ordering of the items is determined from the observed item response data, it follows that the skill mastery patterns identified in a tree's terminal nodes are skill mastery patterns which one might expect to observe, with high frequency at the designated proficiency levels. The skill mastery patterns identified in the six terminal nodes in FIG. 12 are listed in FIG. 14.

As shown in FIG. 14, two of the six states can not be represented within the set of 64 states generated by the Boolean procedure. That is, it is not possible to describe the identified state by assigning a mastery status to Attributes A1 through A6, as these attributes are currently defined. Consideration of these two states illustrates a fundamental difference between the Boolean approach for determining knowledge states and the Tree-Based approach.

The first state which can not be represented within the set of 64 states generated by the Boolean procedure is [State 3: ND3]. This state corresponds to the third terminal node in FIG. 12 (counting from left to right at the bottom of FIG. 12). This node contains six DRT items which involved operations on numbers and included no more that three constraints. The difference in the IRT item difficulty estimates obtained for these six items and those obtained for the six items in the next lower node [State 2: NC4] and those obtained for the six items in the next higher node [State 4: ND4] suggests that there were many students who could solve the [State 2: NC4] problems, and could also solve the [State 3: ND3] problems, but could NOT also solve the [State 4: ND4] problems. In order to represent this mastery pattern we need to be able to indicate that the student has mastered Attribute A6 (solve problems involving four constraints) when Attribute A6 is required to solve a Cost problem but the student has not mastered Attribute A6 when Attribute A6 is required to solve a DRT problem. Indicating this is problematic given the current attribute definitions. One solution is to redefine Attribute A6 as two separate attributes, as follows:

$A6a$: Solve Cost problems involving four constraints $A6b$: Solve DRT problems involving four constraints.

Once Attribute 6 is redefined, as indicated above, an attribute mastery vector for State 3 can be easily defined.

The second state which can not be represented within the set of 64 states generated by the Boolean procedure is [State 5: V3]. This state corresponds to the fifth terminal node in FIG. 12. This state includes examinees who could solve four constraint problems when those problems required working with numbers but could not solve four constraint problems when those problems required working with variables. As was the case above, this problem can be solved by defining an additional attribute, as follows:

$A6c$: Solve story problems involving manipulations with variables and four constraints.

This solution makes defining an attribute mastery vector for this state a simple, straightforward task.

It is important to note that, although the problems described above were easily solved, they were not easily identified. That is, neither the linear regression output (which indicated that all attributes were highly significant) nor the Boolean output (which indicated that all states were detectable) provided any indication that the hypothesized attributes, as originally specified, were incapable of representing two of six knowledge states which one might expect to observe, with high frequency, in large data sets.

In some applications it is sufficient to generate only the most frequent knowledge states. Other applications require that all possible knowledge states be identified. The tree-based approach can be modified to provide all possible knowledge states as follows:

First, redefine the attributes so that the skill combinations identified in the tree's terminal nodes represent distinct attributes, as shown below:

A1': Solve Cost problems involving manipulations with numbers and no more than three constraints.

A2': Solve Cost problems involving manipulations with numbers and Four constraints.

A3': Solve DRT problems involving manipulations with numbers and No more than three constraints.

A4': Solve DRT problems involving manipulations with numbers and Four constraints.

A5': Solve story problems involving manipulations with variables and No more than three constraints.

A6': Solve story problems involving manipulations with variables and Four constraints.

Second, generate all possible subsets of these new attributes.

Note that, in this new system, the six high frequency knowledge states described above represent a Guttman ordering of the required skills.

State 1: 100000

State 2: 110000

State 3: 111000

State 4: 111100

State 5: 111110

State 6: 111111

All other response patterns can be represented by non-Guttman orderings of the required skills. For example, State 2* and State 4*, defined below, are two nonGuttman States which one might also expect to see in the data:

State 2*: Can solve both Cost and DRT problems requiring manipulations with numbers and only 3 constraints. This state corresponds to the following nonGuttman ordering of required skills: 101000.

State 4*: Can solve all manipulate with numbers problems EXCEPT 4-constraint DRT problems, and can also solve 3-constraint manipulate variables problems. This state corresponds to the following nonGuttman ordering of required skills: 111010.

Generating Student-Level Diagnostic Feedback

Once a comprehensive set of knowledge states has been determined, students' individual strengths and weaknesses can be identified by comparing their observed performances to the performances expected within each of the specified states. Several different approaches are available for implementing these comparisons. The following sections summarize four approaches: two approaches which are included as part of this patent application, and two existing approaches which are not covered by this patent application. The two existing approaches are included to illustrate how the the new approaches differ from the existing approaches.

The two approaches covered by this patent application include (1) a mastery testing approach, and (2) an approach involving odds ratios. The two existing approaches include (1) an approach involving augmented subscores (Wainer, H., K. Sheehan, & X. Wang, Some paths toward making Praxis Scores more useful, Princeton, N.J.: Educational Testing Service, 1998), and (2) the Rule Space approach (Tatsuoka, K.K, Architecture of knowledge structures and cognitive diagnosis, P. Nichols, S. Chipman & R. Brennan, Eds., Cognitively diagnostic assessment. Hillsdale, N.J.: Lawrence Erlbaum Associates, 1995).

Generating Student-Level Diagnostic Feedback

A Mastery Testing Approach

An approach for generating diagnostic feedback which involves first using a Tree-Based regression procedure to generate a proficiency scale and then using a mastery testing approach to determine students' relative strengths and weaknesses in accordance with the invention can be summarized as follows. First, the combinations of skills underlying proficiency in the domain are determined by using a tree-based regression analysis to model the relationship between required skills and resulting item difficulty. Second, the tree-based item difficulty model is translated into a student proficiency model by estimating the probability that students at specified score levels will respond correctly to items requiring each of the identified combinations of skills. The resulting student proficiency model is specified in terms of an r×k matrix of skill mastery probabilities, where r is the number of distinct points on the test's reported score scale and k is the number of skill combinations identified in the tree-based analysis. Third, a mastery testing procedure is used to determine whether a student's observed performance in each of the identified skill areas is consistent with the performance expected if the student were performing in accordance with the hypothesized model. Inconsistent performances are either an indication of a relative weakness or an indication of a relative strength. Variations of the mastery testing procedure are described in the following documents: 1) Lewis, C. & K. M. Sheehan, Using Bayesian decision theory to design a computerized mastery test, Applied Psychological Measurement, vol. 14, pp. 367–386, 1990; 2) Sheehan, K. M. & C. Lewis, Computerized mastery testing with nonequivalent testlets, Applied Psychological Measurement, vol. 16, pp. 65–76, 1992; and 3) U.S. Pat. No. 5,059,127 issued to Lewis et al.

Generating Student-Level Diagnostic Feedback

An Approach Involving Odds Ratios

The degree to which a given examinee's observed item response pattern conforms to the pattern expected in a particular knowledge state can be illuminated, in accordance with the invention, by first defining an "ideal item response pattern" for each state and then evaluating the degree to which the examinee's observed pattern matches to each of the specified ideal patterns.

The ideal item response pattern specified for a given state indicates the subset of items that an examinee in that state would be expected to answer correctly and the subset of items that an examinee in that state would be expected to answer incorrectly. Items coded "1" in the ideal patterns correspond to expected correct responses. Items coded "0" in the ideal pattern correspond to expected incorrect responses.

The degree of correspondence between a given observed pattern and a specified ideal pattern can be determined by displaying the observed patterns in the form of a 2×2 contingency table as shown in FIG. 15. Note that, in the notation of FIG. 15, a of the (a+c) correct responses provided by the specified examinee occurred among the items coded as "1" in the ideal response pattern, and c of the (a+c) correct responses provided by the specified examinee occurred among the items coded as "0" in the ideal response pattern.

If the given examinee's observed pattern of correct and incorrect responses is not in any way related to the pattern of skill mastery underlying the hypothesized ideal response pattern, we would expect the conditional probability of a correct response occurring among the items coded "1" in the ideal response pattern to be the same as the conditional probability of a correct response occurring among the items coded "0" in the ideal response pattern. On the other hand, if the examinee's true underlying skill mastery pattern was the same as the pattern underlying the given ideal response pattern, then we would expect the conditional probability of a correct response occurring among the items coded "1" in the ideal response pattern to be much greater than the conditional probability of a correct response occurring among the items coded "0".

It is useful to consider the population probabilities corresponding to the cell counts shown in FIG. 15. The population probabilities are defined as follows:

$p_{11}$=P(the examinee's observed response falls in Cell 11)

$p_{12}$=P(the examinee's observed response falls in Cell 12)

$p_{21}$=P(the examinee's observed response falls in Cell 21)

$p_{22}$=P(the examinee's observed response falls in Cell 22).

The ratio $p_{11}/p_{12}$ is the examinee's odds of responding correctly to an item coded as "1" in the given ideal item response pattern. The ratio $p_{21}/p_{22}$ is the examinee's odds of responding correctly to an item coded "0" in the given ideal item response pattern. The degree to which the examinee's observed item response pattern conforms to the skill mastery pattern underlying the specified ideal response pattern can be evaluated by taking the ratio of these two sets of odds, as follows:

$\alpha = p_{11}/p_{12} \div p_{21}/p_{22}$

This odds ratio can be estimated from the cell counts in FIG. 15 as:

i <α>=ad/bc.

Note that <α> may have any value between zero and ∞. When <α> is close to 1, the data provide support for the hypothesis that the examinee's observed responses were produced independently of the skill mastery pattern underlying the specified ideal response pattern. When <α> is large, the data provide support for the hypothesis that the examinee's observed responses were generated in accordance with the pattern of skill mastery underlying the specified ideal item response pattern.

When the set of knowledge states underlying proficiency in a domain is known, the skill mastery pattern underlying a given examinees' observed item response pattern can be determined using the following operational classification scheme. First, calculate <α> for each of the hypothesized knowledge states. Second, classify the examinee into the state which yields the largest value of <α>. Third, test whether the <α> calculated for the selected state is significantly greater than 1.

Generating Student-Level Diagnostic Feedback

An Approach Involving Augmented Subscores

Many large-scale educational assessments provide student-level diagnostic feedback in the form of subscores associated with specific areas of the content domain. For example, all Praxis score reports provide a summary of the raw points earned in the five or six content areas covered by the assessment. Although this information may be useful to some examinees, content characteristics typically explain only a very small proportion of the observed variation in total test scores. Consequently, content-area subscores tend to rise and fall with the total test score. When subscores are defined in terms of attributes that are known to be significantly related to variation in proficiency however, individual variation in subscore performance can be expected.

As was previously demonstrated, the combinations of cognitive skills underlying proficiency in a domain can be determined by using a tree-based regression technique to model the relationship between required skills and resulting item difficulty. Since the item clusters identified in a tree's terminal nodes can be used to explain variation in observed item difficulties, it follows that subscores defined in terms of those item clusters can be expected to capture useful information about examinees' underlying strengths and weaknesses.

Of course, the aim of generating subscore definitions that are as informative as possible is at odds with the aim of estimating observed subscores that are as reliable as possible. That is, the requirement of informative item clusters is most likely to be met when cluster definitions are narrow rather than broad. On the other hand, the requirement of reliable subscores is most likely to be met when cluster definitions are broad rather than narrow.

Wainer, Sheehan, and Wang describe a subscore estimation procedure which was specifically developed to reconcile the competing aims of high diagnostic value and high reliability. (Wainer, H., Sheehan, K, & Wang, X., Some paths toward making PRAXIS scores more useful, Princeton, N.J.: Educational Testing Service, 1998) In this approach, Bayesian estimation techniques are used to "augment" the information about proficiency in any one cluster with information derived from performance in each of the other clusters. That is, the subscore for any one cluster is tempered by relevant information derived from performance in other clusters. Thus reliable estimates of cluster performance can be obtained even when clusters are based on relatively small numbers of items.

Generating Student-Level Diagnostic Feedback

The Rule Space Approach

In Tatsuoka's Rule Space (RS) approach (Tatsuoka, K.K., Architecture of knowledge structures and cognitive diagnosis, P. Nichols, S. Chipman & R. Brennan, Eds., Cognitively diagnostic assessment. Hillsdale, N.J.: Lawrence Erlbaum Associates, 1995) the performance expected within a particular knowledge state is characterized by defining an "ideal item response pattern" which indicates how an examinee in that state would be expected to perform on each of the items on a specified test form. Examinees' individual skill mastery patterns are subsequently determined by comparing their observed performances to the performances detailed in each of the hypothesized patterns.

Note that, Tatsuoka's approach for generating the set of all possible ideal item response patterns, like her approach for generating the set of all possible knowledge states, is not informed by any analyses of the observed data. That is, the Boolean procedure which operates solely on the hypothesized item-by-skill matrix, provides both the set of all possible knowledge states and the ideal response pattern defined for each state.

In the odds ratio approach described above, the comparison of examinees' observed item response patterns to the hypothesized ideal item response patterns is performed in the n-dimensional space defined by the response patterns. In the RS approach, by contrast, the comparison is performed in a lower dimensional space termed the Rule Space. In the original Rule Space (RS) procedure the classification space was defined to have just two dimensions. The first dimension was defined in terms of the IRT proficiency estimate θ. This dimension captures variation in examinees' observed item response patterns that can be attributed to differences in overall proficiency levels. The second dimension was defined in terms of the variable ζ which is an index of how unusual a particular item response pattern is.

Figure 16:
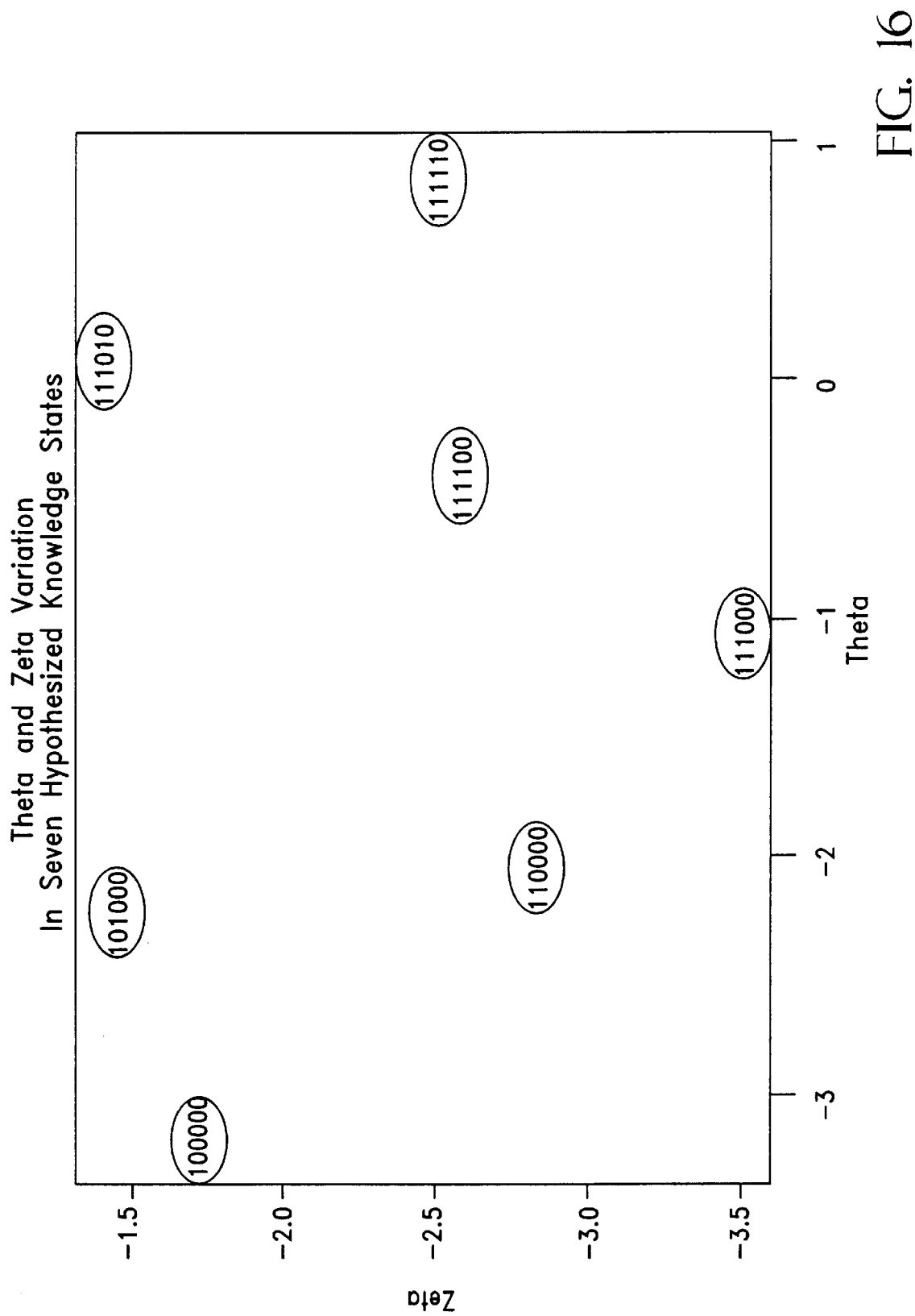
FIG. 16 shows $\theta$ and $\zeta$ variation in seven hypothesized knowledge states FIGS. 17A and 17B provide an explanation for the $\zeta$ variation observed in five hypothesized knowledge states.

The values of θ and ζ calculated for seven of the high frequency states identified in the GRE problem variant data (i.e. States 1 through 5 and State 2* and State 4*) are plotted in FIG. 16. Each state is identified by its characteristic skill mastery pattern (as determined from the redefined attributes A1' through A6'). As can be seen, the states representing nonGuttman orderings of the required skills appear at the top of the ζ scale and the states representing Guttman orderings of the required skills appear toward the bottom of the ζ scale. Since all of the states are well separated its likely that examinees' underlying skill mastery patterns can be determined by comparing their observed values of θ and ζ, to the values calculated for each of the hypothesized states.

Because all of the items in the Enright Study were designed to test a limited number of skills, the study yielded an uncharacteristically small number of knowledge states. In typical diagnostic applications, a much larger number of knowledge states can be expected. For example, in an analysis of the skills underlying performance on SAT Mathematics items, Tatsuoka (1995) reported that 94% of 6,000 examinees were classified into one of 2,850 hypothesized knowledge states.

As noted in Tatsuoka (1995), the two-dimensional RS is not expected to provide accurate classification results when the number of knowledge states is large. This problem is dealt with by defining additional dimensions. The additional dimensions are defined by treating specified subsets of items as "independent" sources of "unusualness" information. This is done by calculating additional ζ's (called generalized ζ's) from subsets of items requiring important combinations of attributes. For example, an additional dimension for the GRE data could be defined by calculating an additional ζ from the subset of 24 items that were classified as requiring the skill "Solve story problems requiring manipulations with variables".

Figure 17A:
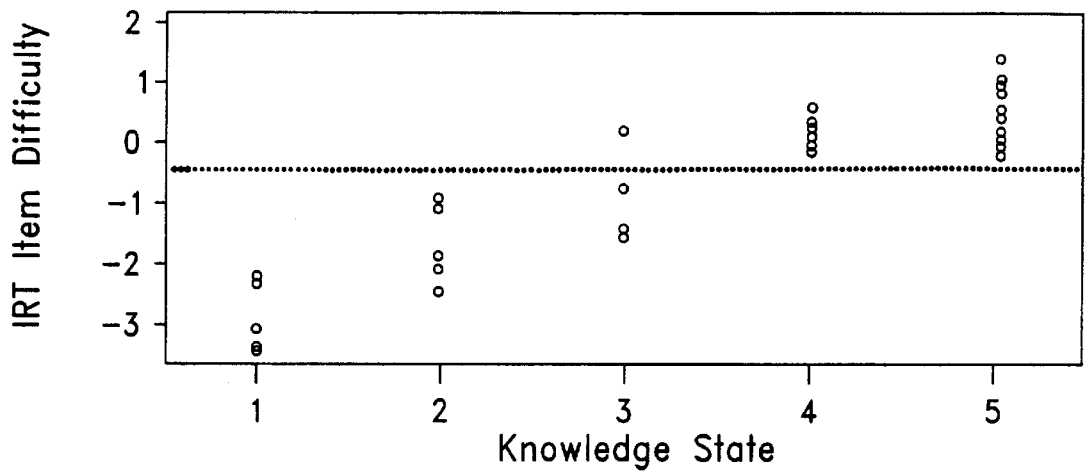
Figure 17B:
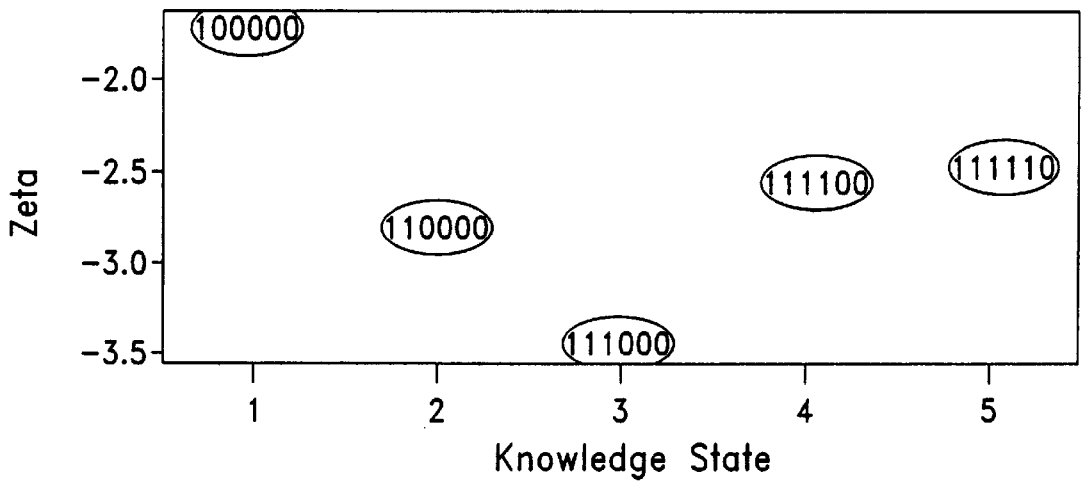

The role of the ζ dimension in the multidimensional RS can be understood by considering the original ζ's more closely. FIGS. 17A and 17B provide one possible explanation for the variation captured by the ζ dimension. The plot in FIG. 17A displays variation in the estimated IRT item difficulty values of the items that examinees in selected GRE knowledge states would be expected to answer correctly. In addition, the plot also displays resulting variation in the selected state's ζ values. To clarify, the six item difficulty values plotted at State 1 are the six items that an examinee in State 1 would be expected to answer correctly. The six item difficulty values plotted at State 2 are the six additional items that an examinee in State 2 would be expected to answer correctly. That is, an examinee in State 2 would be expected to respond correctly to a total of twelve items: the six items plotted at State 1 and the six items plotted at State 2. Similarly, an examinee in State 3 would be expected to respond correctly to a total of eighteen items: the six items plotted at State 1, the six items plotted at State 2, and the six items plotted at State 3. The plot shows that variation in the ζ values calculated for specific states can be explained by determining the number of individual ideal responses that would have to be switched (from correct to incorrect or from incorrect to correct) in order to transform the given ideal pattern into a true Guttman pattern. The horizontal line shows the number of switches needed to transform the ideal pattern for State 3 into a true Guttman pattern. As can be seen, only one switch is needed. Thus State 3 is characterized as being more Guttman-like than any of the other states.

As shown in FIG. 17B, the variation measured by a specified generalized ζ is slightly different. In this case, the dimension is measuring the degree of Guttman-like behavior within the subset of responses provided in one or two specified nodes. Thus, the impact of a slip from correct to incorrect, or from incorrect to correct, depends on whether the difficulty value of the item slipped on fell in the middle of a node's difficulty distribution or towards one or another of the extremes of the node's difficulty distribution. Thus, the classification procedure is affected by the distribution of observed item difficulty values within a tree's terminal nodes. This represents a limitation of the RS procedure because the variation being considered is variation which is not accounted for in the hypothesized proficiency model. That is, it is the variation remaining after variation attributed to the hypothesized proficiency model has been accounted for. The Tree-Based approach is not subject to this limitation because variation in generalized ζ values is not considered when making individual skill mastery decisions.

Figure 18:
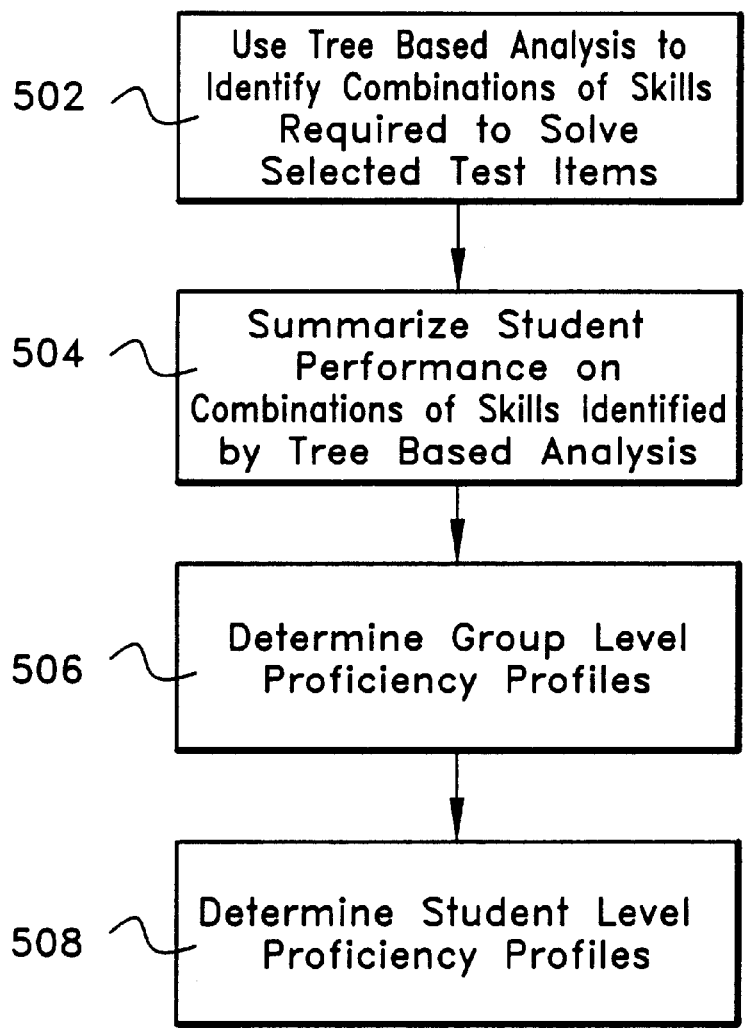
FIG. 18 is a flowchart of a preferred embodiment of a method according to the present invention.

FIG. 18 is a flowchart of a preferred embodiment of a method 500 for diagnostic assessment and proficiency scaling of test results for a plurality of tests according to the present invention. Each test has at least one item and each item has at least one feature. Method 500 uses as input a vector of item difficulty estimates for each of n items and a matrix of hypothesized skill classifications for each of the n items on each of k skills. At step 502, a tree-based regression analysis based on the input vector and matrix is used as described above to model ways in which required skills interact with different item features to produce differences in item difficulty. The tree-based analysis identifies combinations of skills required to solve each item.

A plurality of clusters is formed by grouping the items according to a predefined prediction rule based on skill classifications. Preferably, the plurality of clusters is formed by successively splitting the items, based on the identified skill classifications, into increasingly homogeneous subsets called nodes. For example, the clusters can be formed by selecting a locally optimal sequence of splits using a recursive partitioning algorithm to evaluate all possible splits of all possible skill classification variables at each stage of the analysis. In a preferred embodiment, a user can define the first split in the recursive analysis.

Ultimately, a plurality of terminal nodes is formed by grouping the items to minimize deviance among items within each terminal node and maximize deviance among items from different terminal nodes. At this point, a mean value of item difficulty can be determined for a given terminal node based on the items forming that node. The value of item difficulty is then predicted, for each item in the given terminal node, to be the corresponding mean value of item difficulty.

At step 504, a nonparametric smoothing technique is used to summarize student performance on the combinations of skills identified in the tree-based analysis. The smoothing technique results in cluster characteristic curves that provide a probability of responding correctly to items with specified skill requirements. This probability is expressed as a function of underlying test score.

At step 506, group-level proficiency profiles are determined from the cluster characteristic curves for groups of examinees at selected underlying test scores. At step 508, student-level diagnoses are determined by deriving an expected cluster score from each cluster characteristic curve and comparing a cluster score for each examinee to the expected cluster score.

Figure 19:
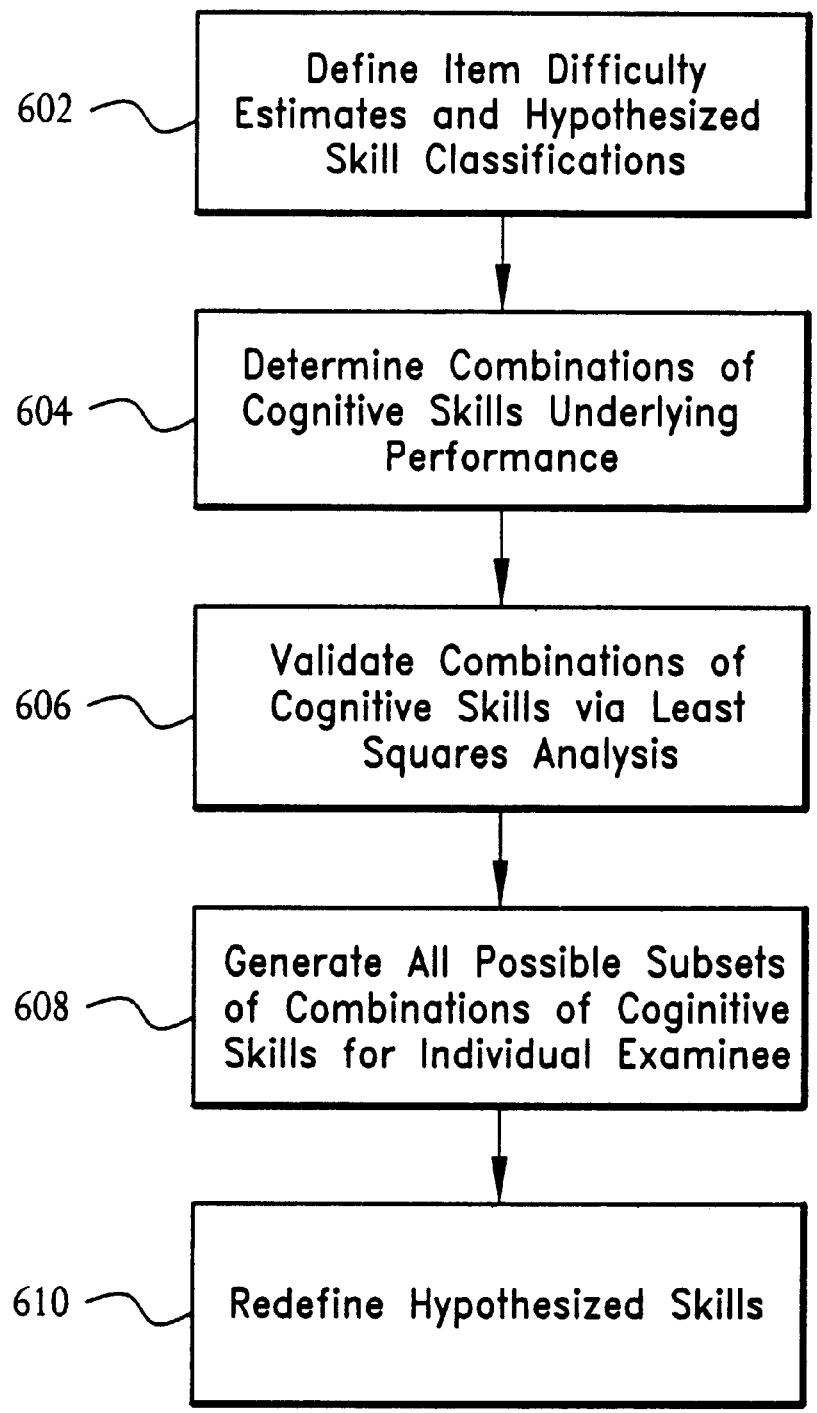
FIG. 19 is a flowchart of another preferred embodiment of a method according to the present invention.

FIG. 19 is a flowchart of another preferred embodiment of a method 600 for diagnostic assessment and proficiency scaling of test results for a plurality of tests according to the present invention. Again, each test has at least one item and each item has at least one feature. At step 602, a vector of item difficulty estimates for each of n items is defined, along with a matrix of hypothesized skill classifications for each of the n items on each of k hypothesized skills. At step 604, a tree-based regression technique is used to determine, based on the vector and matrix, the combinations of cognitive skills underlying performance at increasingly advanced levels on the test's underlying proficiency scale using. Preferably, the combinations are determined by forming a plurality of terminal nodes by grouping the items to minimize deviance among items within each terminal node and maximize deviance among items from different terminal nodes. At step 606, the combinations are validated using a classical least squares regression analysis.

At step 608, the set of all possible subsets of combinations of cognitive skills that could have been mastered by an individual examinee is generated and at step 610, the k hypothesize skills are redefined to form a set of k' redefined skills such that each of the k' redefined skills represents one of the terminal nodes.

While the invention has been described and illustrated with reference to specific embodiments, those skilled in the art will recognize that modification and variations may be made without departing from the principles of the invention as described herein above and set forth in the following claims.

I claim:

1. A method for diagnostic assessment and proficiency scaling of test results for a plurality of tests, each said test having at least one item, each said item having at least one feature, the method using as input a vector of item difficulty estimates for each of n items and a matrix of hypothesized skill classifications for each of said n items on each of k skills, the method comprising the steps of:

using a tree-based regression analysis based on said vector and said matrix to model ways in which required skills interact with different item features to produce differences in item difficulty, said analysis identifying combinations of skills required to solve each said item, and forming a plurality of clusters by grouping said items according to a predefined prediction rule based on skill classifications; and using a nonparametric smoothing technique to summarize student performance on the combinations of skills identified in the tree-based analysis, said smoothing technique resulting in cluster characteristic curves that provide a probability of responding correctly to items with specified skill requirements, said probability expressed as a function of underlying test score.

2. The method of claim 1, comprising the further step of:

determining group-level proficiency profiles from said cluster characteristic curves for groups of examinees at selected underlying test scores.

3. The method of claim 2, comprising the further step of:

generating student-level diagnoses by comparing a cluster score for each examinee to an expected cluster score, said expected cluster score derived from each said cluster characteristic curve.

4. The method of claim 1, comprising the step of:

forming said plurality of clusters by successively splitting the items, based on said skill classifications, into increasingly homogeneous subsets and defining each said subset to be a node.

5. The method of claim 4, wherein said plurality of clusters is formed by selecting a locally optimal sequence of splits using a recursive partitioning algorithm to evaluate all possible splits of all possible skill classification variables at each stage of the analysis.

6. The method of claim 4, comprising the further step of:

forming a plurality of terminal nodes, wherein each said terminal node contains a unique subset of said items, wherein said plurality of terminal nodes is formed by grouping said items to minimize deviance among items within each said terminal node and maximize deviance among items from different terminal nodes.

7. The method of claim 6, comprising the further step of:

determining a mean value of item difficulty corresponding to at least one said terminal node based on the items forming said at least one terminal node; and predicting the value of item difficulty for at least one item in said at least one terminal node based on the corresponding mean value of item difficulty.

8. The method of claim 4, wherein the step of forming said plurality of clusters comprises a user defining a first split.

9. A method for diagnostic assessment and proficiency scaling of test results for a plurality of tests, each said test having at least one item, the method comprising the steps of:

defining a vector of item difficulty estimates for each of n items and a matrix of hypothesized skill classifications for each of said n items on each of k hypothesized skills;

determining the combinations of cognitive skills underlying performance at increasingly advanced levels on the test's underlying proficiency scale using a tree-based regression technique based on said vector and said matrix; and generating the set of all possible subsets of said combinations of cognitive skills that could have been mastered by an individual examinee.

10. The method of claim 9, comprising the further step of:

validating said combinations of cognitive skills via a least squares regression analysis.

11. The method of claim 9, wherein the determining step comprises the steps of:

forming a plurality of terminal nodes, wherein each said terminal node contains a unique subset of said items, wherein said plurality of terminal nodes is formed by grouping said items to minimize deviance among items within each said terminal node and maximize deviance among items from different terminal nodes.

12. The method of claim 11, comprising the further step of:

redefining said k hypothesized skills to form a set of k' redefined skills such that each of said k' redefined skills represents one of said terminal nodes.

* * * * *